(12) United States Patent  (10) Patent No.: US 9,025,097 B2
Hirosawa  (45) Date of Patent: May 5, 2015

(54) LIQUID CRYSTAL DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 46 days.

(21) Appl. No.: 14/048,361

(22) Filed: Oct. 8, 2013

(65) Prior Publication Data
US 2014/0036214 A1 Feb. 6, 2014

Related U.S. Application Data

(63) Continuation of application No. PCT/JP2012/053544, filed on Feb. 15, 2012.

(30) Foreign Application Priority Data

Apr. 8, 2011 (JP) ................................. 2011-086560

(51) Int. Cl.
G02F 1/1343 (2006.01)
G02F 1/1362 (2006.01)
G02F 1/1337 (2006.01)

(52) U.S. Cl.
CPC .... *G02F 1/134363* (2013.01); *G02F 1/136213* (2013.01); *G02F 2001/134318* (2013.01); *G02F 2001/133757* (2013.01)

(58) Field of Classification Search
USPC .................................................. 349/141, 39
See application file for complete search history.

(56) References Cited

U.S. PATENT DOCUMENTS

| 6,266,116 | B1 | 7/2001 | Ohta et al. |
| 6,657,693 | B1 | 12/2003 | Jeong et al. |
| 8,488,087 | B2 * | 7/2013 | Mori et al. ................. 349/114 |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |

(Continued)

FOREIGN PATENT DOCUMENTS

| JP | 06-222397 | 8/1994 |
| JP | 7-36058 A | 2/1995 |

(Continued)

OTHER PUBLICATIONS

Office Action issued Nov. 18, 2014 in Japanese Patent Application No. 2013-508783 (with English language translation).

(Continued)

*Primary Examiner* — Wen-Ying P Chen
(74) *Attorney, Agent, or Firm* — Oblon, McClelland, Maier & Neustadt, L.L.P.

(57) ABSTRACT

According to one embodiment, a liquid crystal display device includes a first substrate including a first storage capacitance line and a second storage capacitance line, a gate line, a first source line and a second source line, a main pixel electrode which has a strip shape, a first sub-pixel electrode which is continuous with the main pixel electrode, a second sub-pixel electrode which is continuous with the main pixel electrode, and a first alignment film, a second substrate including second main common electrodes extending on both sides of the main pixel electrode, a second sub-common electrode which is continuous with the second main common electrodes, and a second alignment film, and a liquid crystal layer held between the first substrate and the second substrate.

20 Claims, 15 Drawing Sheets

(56) References Cited

U.S. PATENT DOCUMENTS

| | | |
|---|---|---|
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0218646 A1 | 9/2008 | Miyachi et al. |
| 2009/0207363 A1 | 8/2009 | Hirosawa |
| 2012/0099070 A1* | 4/2012 | Hirosawa et al. ............ 349/143 |

FOREIGN PATENT DOCUMENTS

| | | |
|---|---|---|
| JP | 07-159807 | 6/1995 |
| JP | 09-160041 | 6/1997 |
| JP | 09-160042 | 6/1997 |
| JP | 09-160061 | 6/1997 |
| JP | 10-3092 A | 1/1998 |
| JP | 10-026765 | 1/1998 |
| JP | 10-090708 | 4/1998 |
| JP | 10-186366 A | 7/1998 |
| JP | 2000-310791 A | 11/2000 |
| JP | 2001-282205 A | 10/2001 |
| JP | 2003-241213 A | 8/2003 |
| JP | 2005-003802 | 1/2005 |
| JP | 3644653 B2 | 2/2005 |
| JP | 2005-84233 A | 3/2005 |
| JP | 2005-242307 | 9/2005 |
| JP | 2006-53592 A | 2/2006 |
| JP | 2007-516464 A | 6/2007 |
| JP | 2009-192822 A | 8/2009 |
| JP | 2009-216793 A | 9/2009 |
| JP | 2009-244287 A | 10/2009 |
| KR | 10-2007-0101923 A | 10/2007 |

OTHER PUBLICATIONS

U.S. Appl. No. 14/048,552, filed Oct. 8, 2013, Hirosawa, et al.
International Preliminary Report on Patentability issued Oct. 17, 2013, in PCT/JP2012/053544 filed Feb. 15, 2012 (submitting English translation only).
Written Opinion issued Mar. 19, 2012, in PCT/JP2012/053544 filed Feb. 15, 2012 (submitting English translation only).
Office Action issued Aug. 30, 2014, in Korean Patent Application No. 10-2013-7026141 with English translation.
International Search Report mailed Mar. 19, 2012 for PCT/JP2012/053544 filed on Feb. 15, 2012 with English Translation.
International Written Opinion mailed Mar. 19, 2012 for PCT/JP2012/053544 filed on Feb. 15, 2012.

* cited by examiner

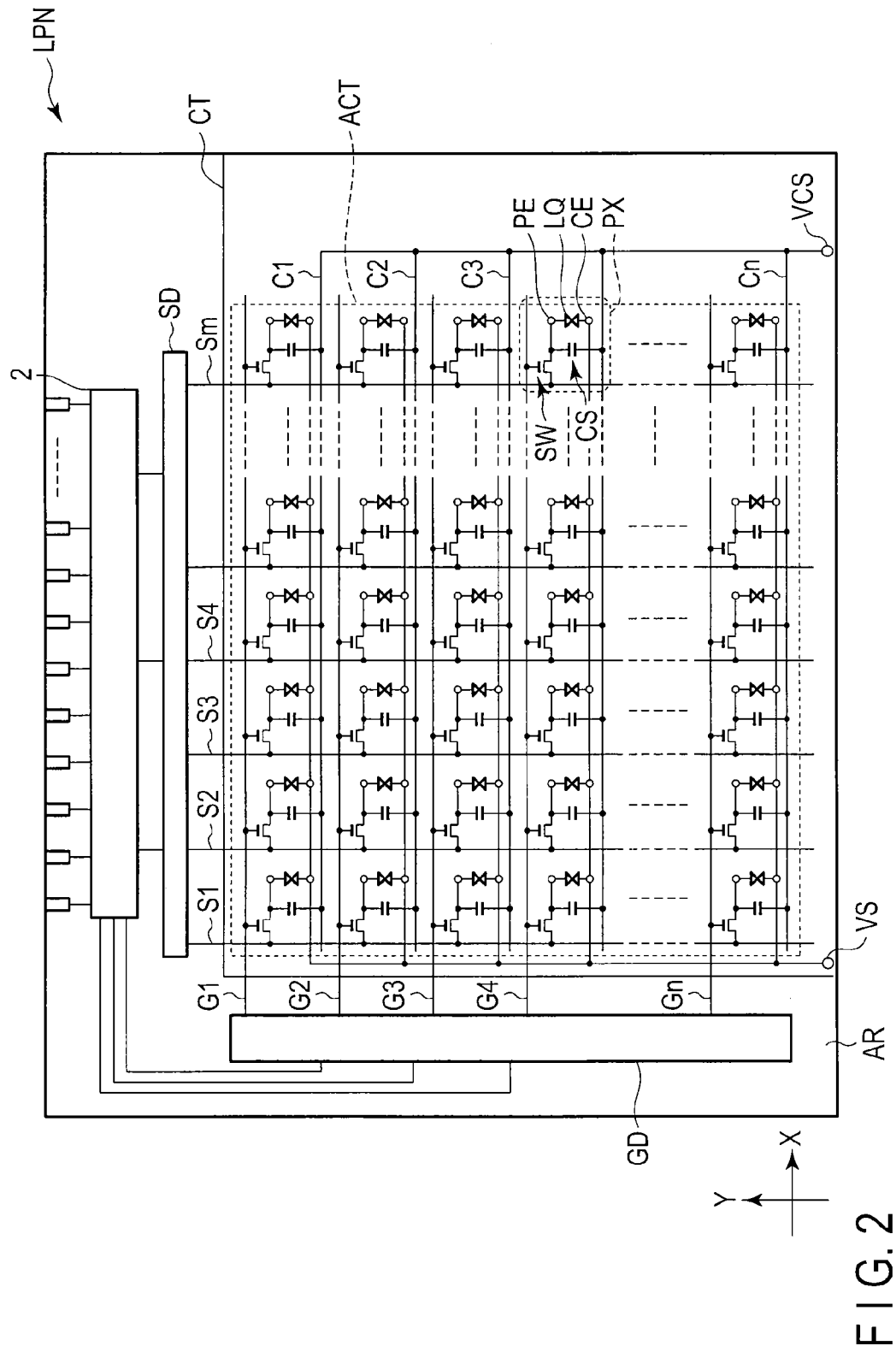
F I G. 2

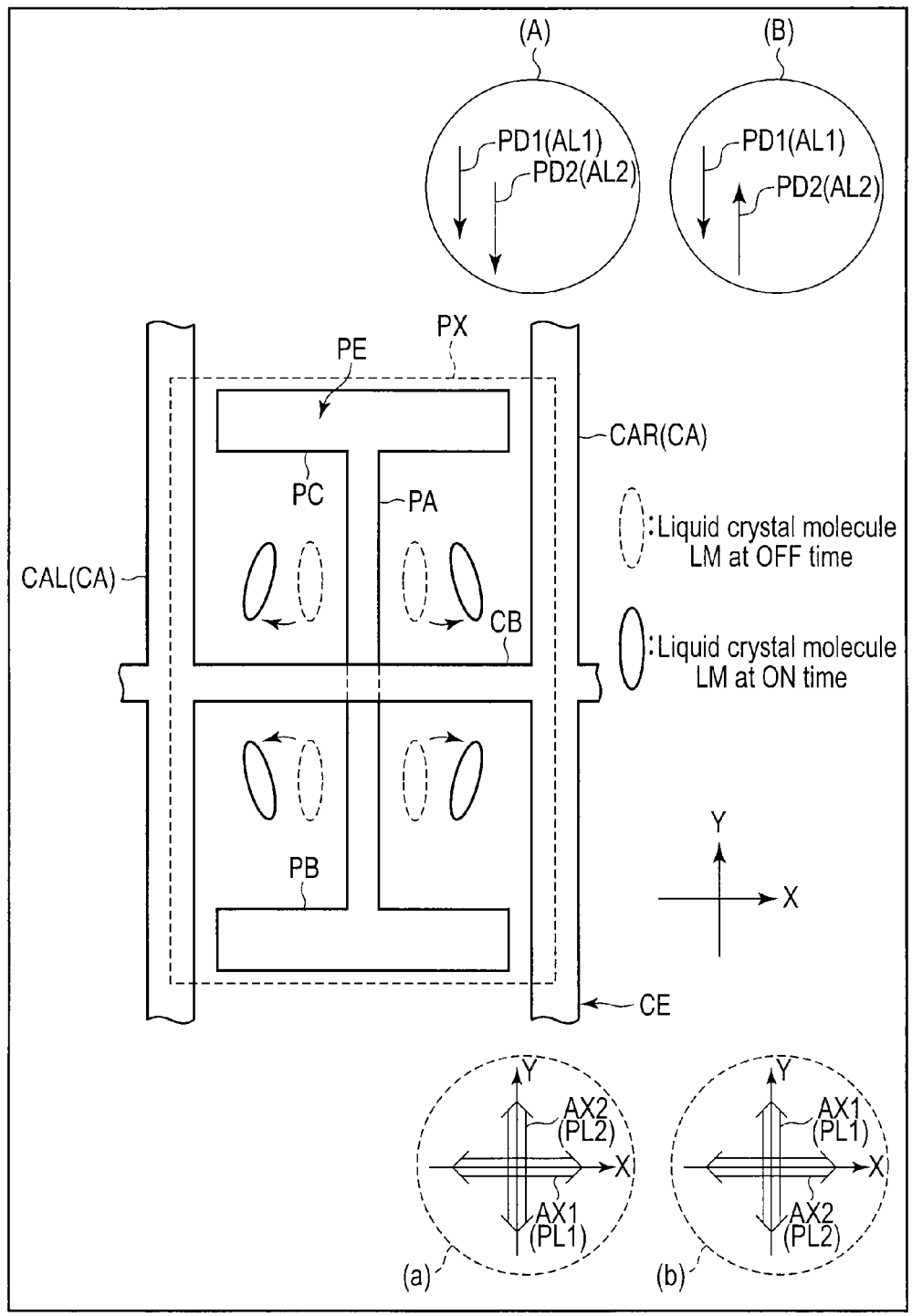
F I G. 3

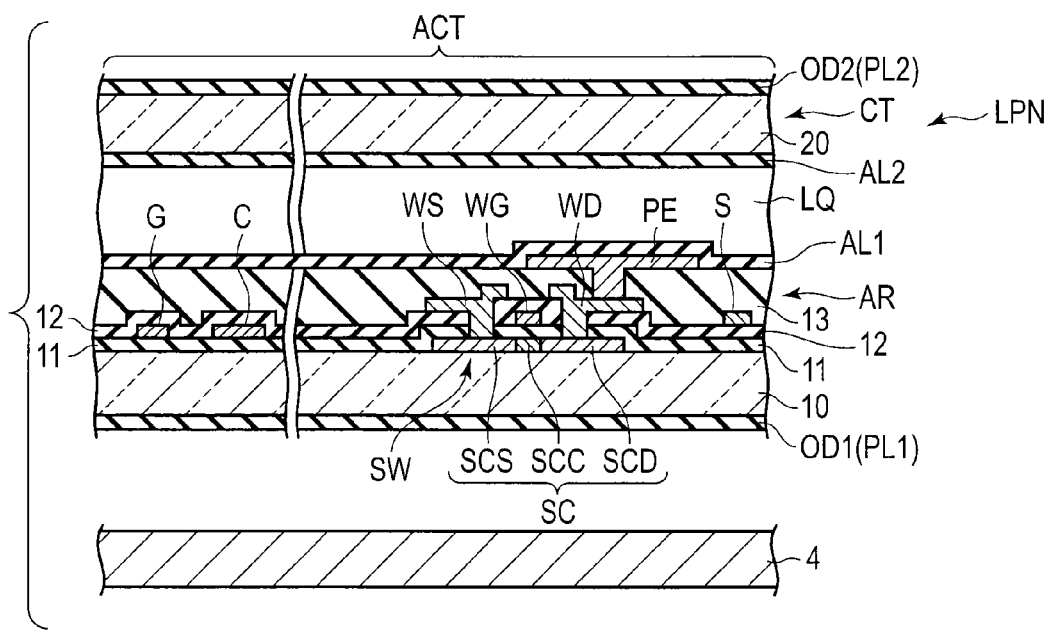
F I G. 4

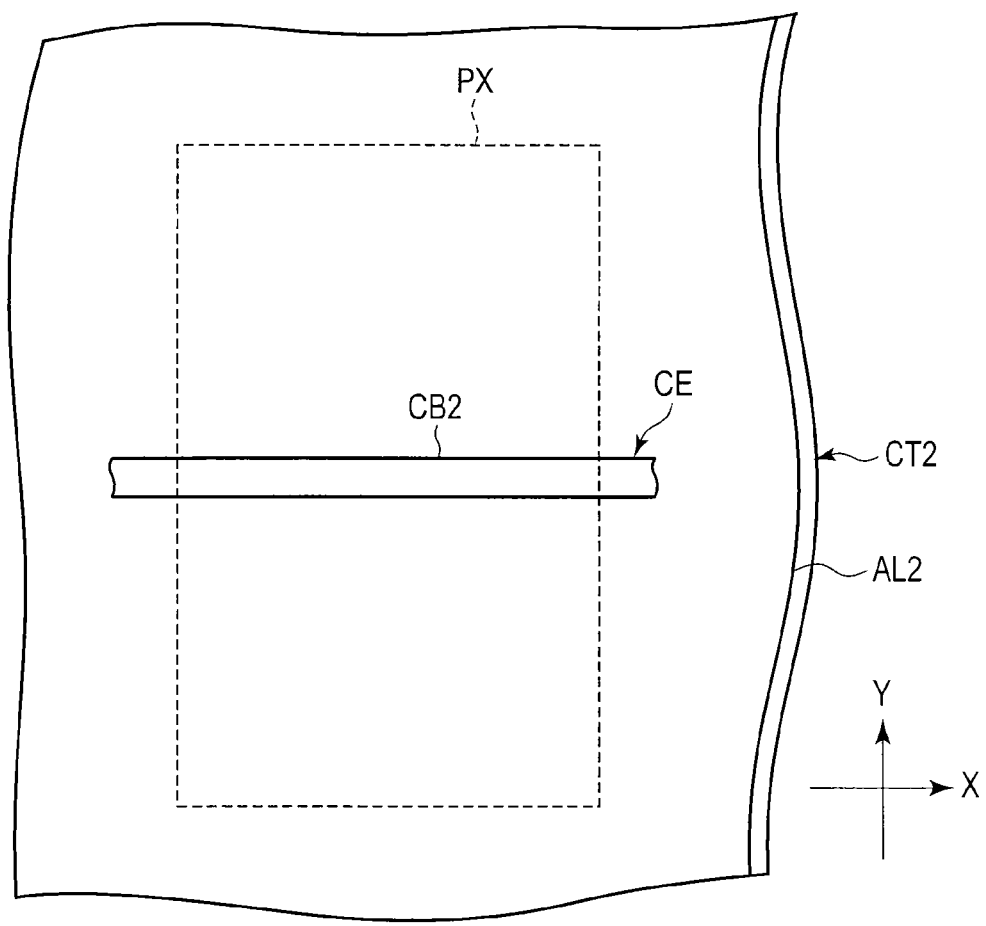
F I G. 7

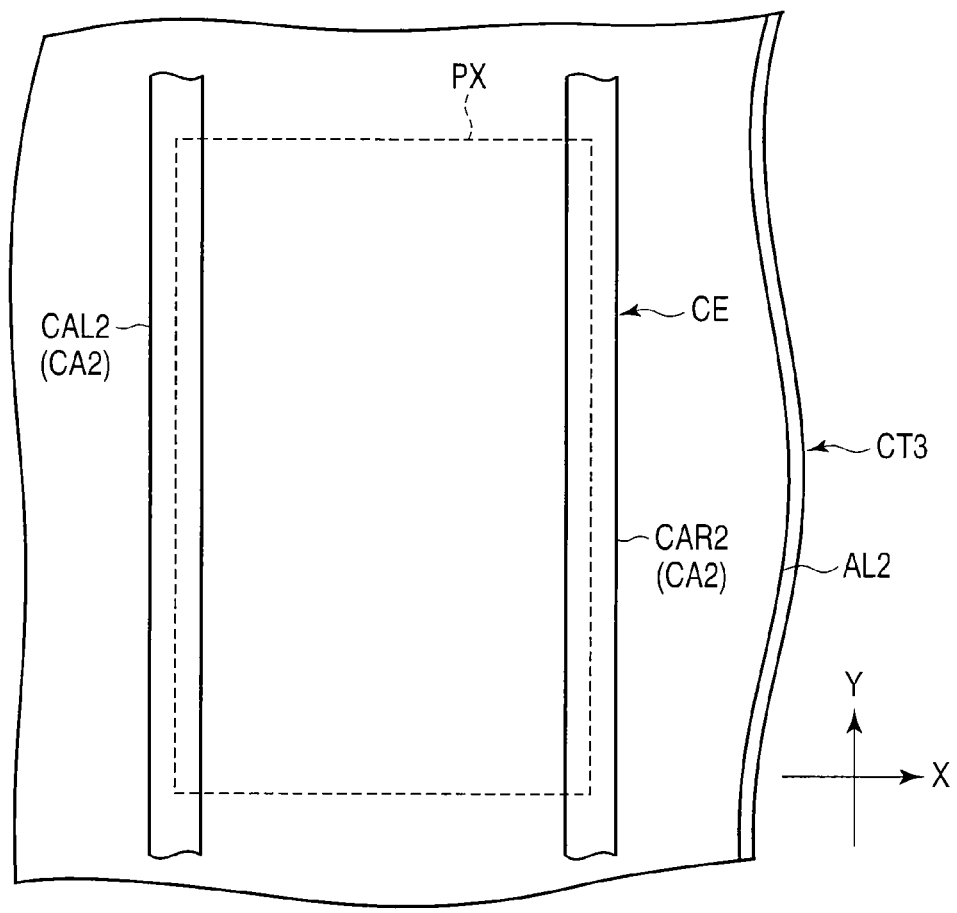
F I G. 9

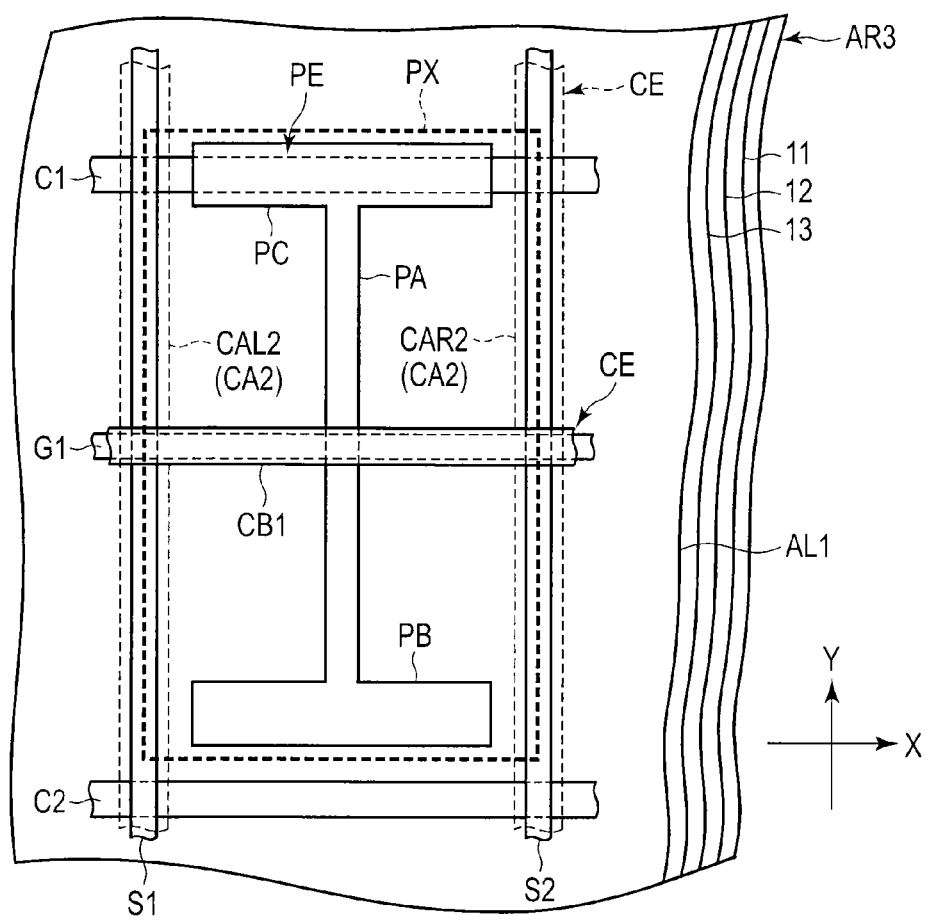
F I G. 10

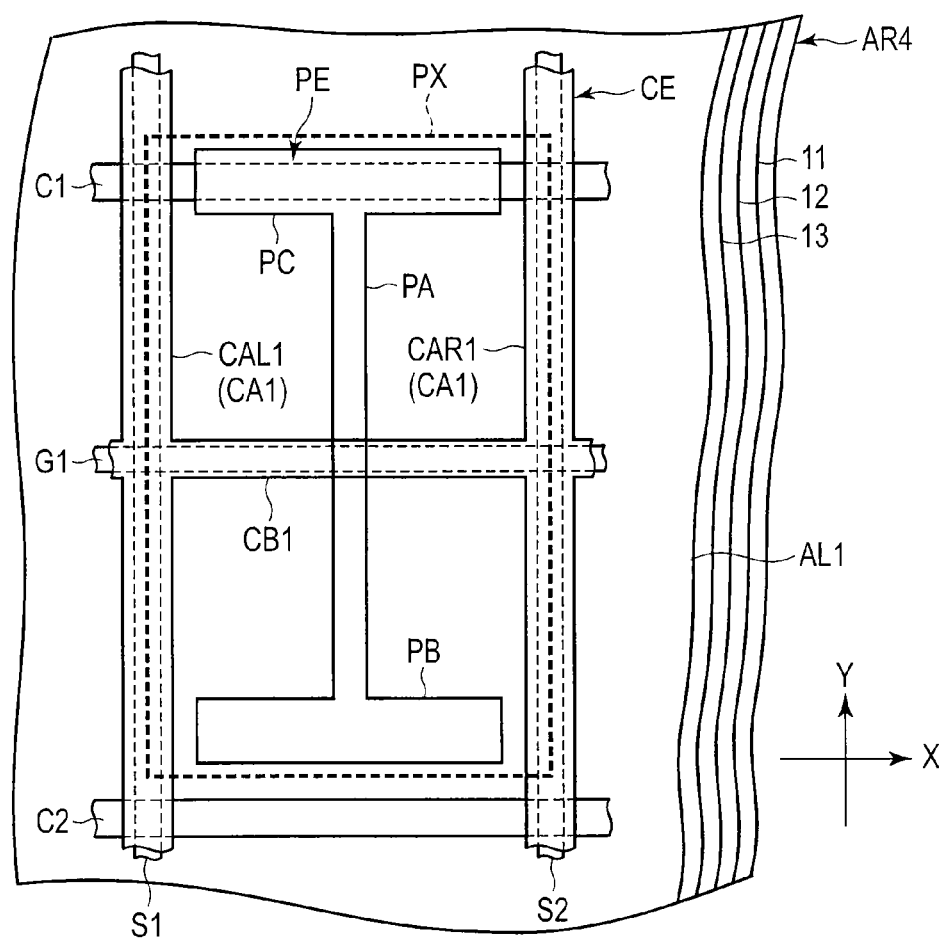
F I G. 11

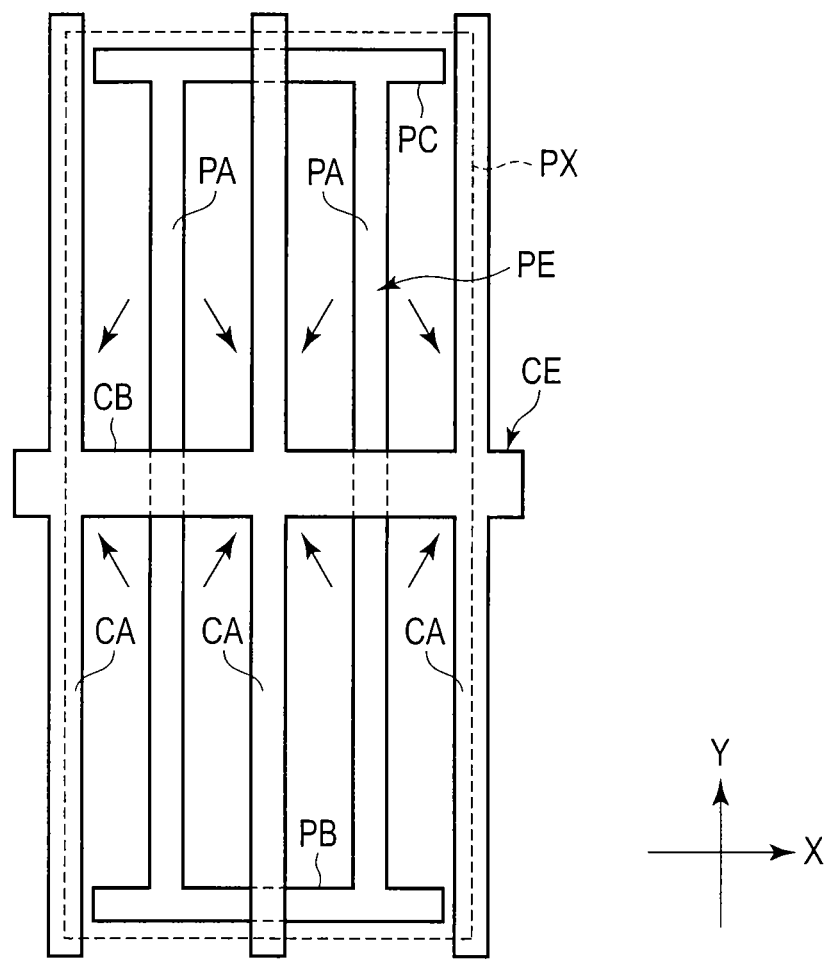
F I G. 13

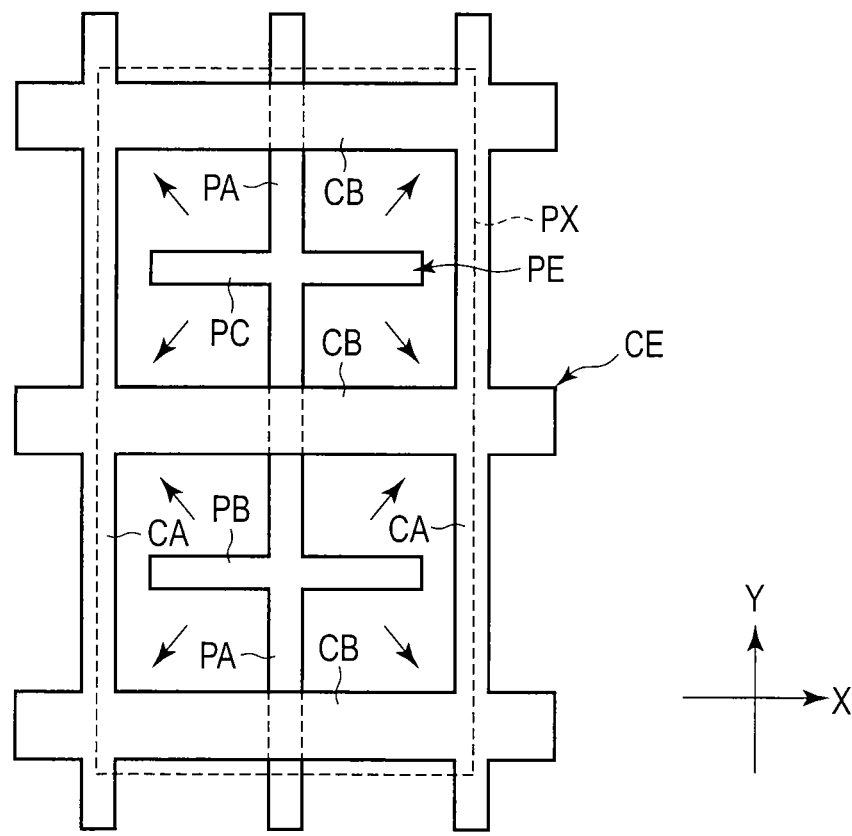
F I G. 14

LIQUID CRYSTAL DISPLAY DEVICE

CROSS REFERENCE TO RELATED APPLICATIONS

This application is a Continuation Application of PCT Application No. PCT/JP2012/053544, filed Feb. 15, 2012 and based upon and claiming the benefit of priority from Japanese Patent Application No. 2011-086560, filed Apr. 8, 2011, the entire contents of all of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal display devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a view which schematically shows a structure and an equivalent circuit of a liquid crystal display panel shown in FIG. 1.

FIG. 3 is a plan view which schematically shows a minimum unit structure in one pixel in a basic structure of the embodiment.

FIG. 4 is a schematic cross-sectional view showing a cross section of the liquid crystal display including a switching element.

FIG. 7 is a plan view which schematically shows the structure of one pixel on a counter-substrate of a liquid crystal display panel in a second structure example of the embodiment.

FIG. 9 is a plan view which schematically shows the structure of one pixel on a counter-substrate of a liquid crystal display panel in a third structure example of the embodiment.

FIG. 10 is a plan view which schematically shows the structure of an array substrate, at a time when the pixel of the liquid crystal display panel in the third structure example of the embodiment is viewed from the counter-substrate side.

FIG. 11 is a plan view which schematically shows the structure of an array substrate, at a time when one pixel of a liquid crystal display panel in a fourth structure example of the embodiment is viewed from the counter-substrate side.

FIG. 13 is a plan view which schematically shows one variation of the embodiment.

FIG. 14 is a plan view which schematically shows another variation of the embodiment.

DETAILED DESCRIPTION

Figure 1:
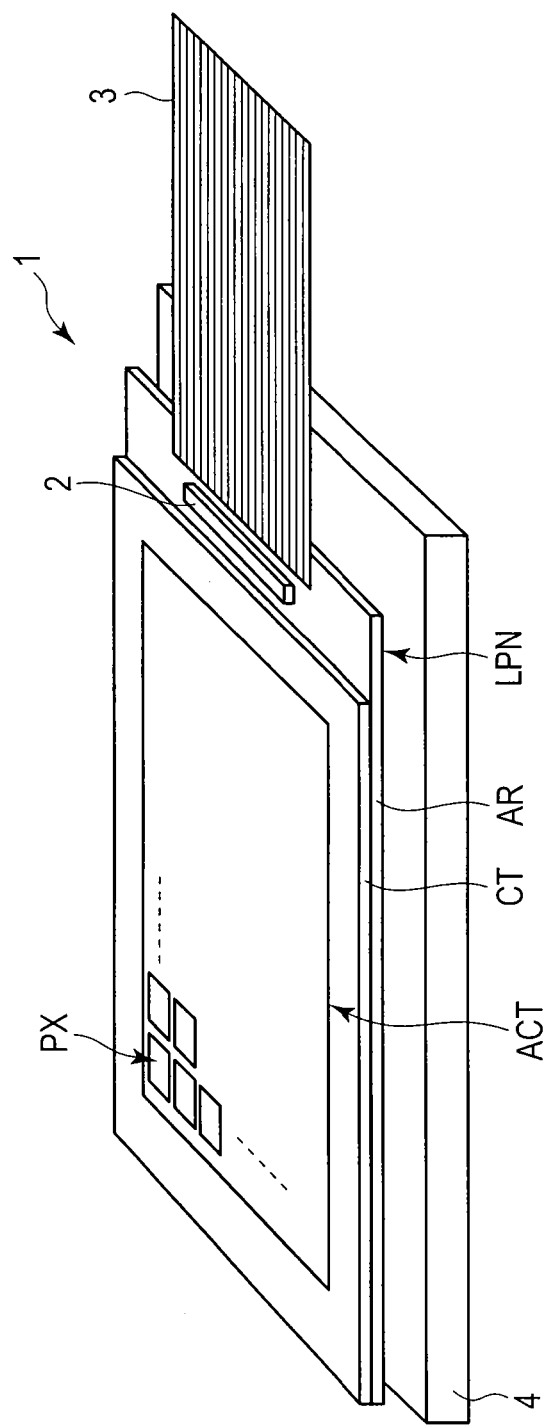
FIG. 1 is a view which schematically shows the structure of a liquid crystal display device according to an embodiment.

In general, according to one embodiment, a liquid crystal display device includes: a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, and a first alignment film which is formed of a material exhibiting horizontal alignment properties and covers the main pixel electrode, the first sub-pixel electrode and the second sub-pixel electrode; a second substrate including second main common electrodes extending in the second direction on both sides of the main pixel electrode, a second sub-common electrode which is continuous with the second main common electrodes and extends in the first direction between the first sub-pixel electrode and the second sub-pixel electrode, and a second alignment film which is formed of a material exhibiting horizontal alignment properties and covers the second main common electrodes and the second sub-common electrode; and a liquid crystal layer including liquid crystal molecules held between the first substrate and the second substrate.

According to another embodiment, a liquid crystal display device includes: a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, first main common electrodes which are opposed to the first source line and the second source line, respectively, and extend in the second direction, and a first alignment film which is formed of a material exhibiting horizontal alignment properties and covers the main pixel electrode, the first sub-pixel electrode, the second sub-pixel electrode and the first main common electrodes; a second substrate including a second sub-common electrode which extends in the first direction between the first sub-pixel electrode and the second sub-pixel electrode, and a second alignment film which is formed of a material exhibiting horizontal alignment properties and covers the second sub-common electrode; and a liquid crystal layer including liquid crystal molecules held between the first substrate and the second substrate.

According to another embodiment, a liquid crystal display device includes: a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, a first sub-common electrode which is opposed to the gate line and extends in the first direction, and a first alignment film which is formed of a material exhibiting horizontal alignment properties and covers the main pixel electrode, the first sub-pixel electrode, the second sub-pixel electrode and the first sub-common electrode; a second substrate including second main common electrodes which extend in the second direction on both sides of the main pixel electrode and have the same potential as the first sub-common electrode, and a second alignment film which is formed of a material exhibiting horizontal alignment properties and covers the second main common electrodes; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows the structure of a liquid crystal display device 1 according to an embodiment.

Specifically, the liquid crystal display device 1 includes an active-matrix-type liquid crystal display panel LPN, a driving IC chip 2 and a flexible wiring board 3 which are connected to the liquid crystal display panel LPN, and a backlight 4 which illuminates the liquid crystal display panel LPN.

The liquid crystal display panel LPN is configured to include an array substrate AR as a first substrate, a counter-substrate CT as a second substrate which is disposed to be opposed to the array substrate AR, and a liquid crystal layer (not shown) which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

In the example illustrated, the backlight 4 is disposed on the back side of the array substrate AR. As the backlight 4, various modes are applicable, and use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

FIG. 2 is a view which schematically shows a structure and an equivalent circuit of the liquid crystal display panel LPN shown in FIG. 1.

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend, for example, substantially linearly in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane, which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. In the active area ACT, an (m×n) number of switching elements SW are formed.

The pixel electrodes PE are disposed in the respective pixels PX, and are electrically connected to the switching elements SW. In the active area ACT, an (m×n) number of pixel electrodes PE are formed. The common electrode CE has, for example, a common potential, and is disposed common to the pixel electrodes PE of plural pixels PX via the liquid crystal layer LQ.

The array substrate AR includes a power supply module VS for applying a voltage to the common electrode CE. The power supply module VS is formed, for example, on the outside of the active area ACT. Of the common electrode, at least a part of the common electrode CE formed on the counter-substrate CT is led out to the outside of the active area ACT, and is electrically connected to the power supply module VS formed on the array substrate AR via an electrically conductive member (not shown). Incidentally, in a case where a part of the common electrode CE is formed on the array substrate AR, a part of the common electrode CE formed on the array substrate AR is electrically connected to the power supply module VS, for example, on the outside of the active area ACT.

Next, a basic structure of the embodiment is described.

FIG. 3 is a plan view which schematically shows a minimum unit structure in one pixel PX.

The pixel electrode PE includes a main pixel electrode PA, a first sub-pixel electrode PB, and a second sub-pixel electrode PC. The main pixel electrode PA, first sub-pixel electrode PB and second sub-pixel electrode PC are electrically connected to each other. In the present embodiment, each of the main pixel electrode PA, first sub-pixel electrode PB and second sub-pixel electrode PC is provided on the array substrate AR. The main pixel electrodes PA extends in a second direction Y. The first sub-pixel electrode PB and second sub-pixel electrode PC extend in a first direction X which is different from the second direction Y. The second sub-pixel electrode PC is spaced apart from the first sub-pixel electrode PB.

In the example illustrated, the pixel electrode PE is formed in a substantially I-shape. To be more specific, the main pixel electrode PA is formed in a strip shape linearly extending in the second direction Y at a substantially central part of the pixel. The first sub-pixel electrode PB and second sub-pixel electrode PC are formed, respectively, in strip shapes linearly extending in the first direction X at an upper side end portion and a lower side end portion of the pixel PX.

In the meantime, the first sub-pixel electrode PB and second sub-pixel electrode PC may be disposed, respectively, between the present pixel PX and pixels neighboring this pixel on upper and lower sides. In other words, the first sub-pixel electrode PB may be disposed to extend over a boundary between the illustrated pixel PX and a pixel (not shown) neighboring on the lower side thereof, and the second sub-pixel electrode PC may be disposed to extend over a boundary between the illustrated pixel PX and a pixel (not shown) neighboring on the upper side thereof.

The first sub-pixel electrode PB is coupled to, for example, one end portion of the main pixel electrode PA, and extends from the main pixel electrode PA toward both sides thereof. The second sub-pixel electrode PC is coupled to, for example, the other end portion of the main pixel electrode PA, and extends from the main pixel electrode PA toward both sides thereof. The first sub-pixel electrode PB and second sub-pixel electrode PC are substantially perpendicular to the main pixel electrode PA. Incidentally, the first sub-pixel electrode PB may be coupled to a part of the main pixel electrode PA, which is slightly away from the one end portion of the main pixel electrode PA toward the other end side of the main pixel electrode PA. Similarly, the second sub-pixel electrode PC may be coupled to a part of the main pixel electrode PA, which is slightly away from the other end portion of the main pixel electrode PA toward the one end side of the main pixel electrode PA. The pixel electrode PE is electrically connected to the switching element (not shown), for example, at the second sub-pixel electrode PC.

The common electrode CE includes main common electrodes CA and a sub-common electrode CB. The main common electrodes CA and sub-common electrode CB are electrically connected to each other. The common electrode CE is electrically insulated from the pixel electrode PE. In the present embodiment, at least a part of the main common electrodes CA and sub-common electrode CB of the common electrode CE is provided on the counter-substrate CT.

The main common electrodes CA extend in the second direction Y. The main common electrodes CA are disposed on both sides of the main pixel electrode PA. At this time, in the X-Y plane, neither of the main common electrodes CA overlaps the main pixel electrode PA, and substantially equal intervals are provided between the main common electrodes CA, on the one hand, and the main pixel electrode PA, on the other hand. In short, the main pixel electrode PA is located at a substantially middle point between the neighboring main common electrodes CA.

The sub-common electrode CB extends in the first direction X. The sub-common electrode CB is disposed between the first sub-pixel electrode PB and the second sub-pixel electrode PC. At this time, in the X-Y plane, the sub-common electrode CB overlaps neither the first sub-pixel electrode PB nor second sub-pixel electrode PC, and substantially equal intervals are provided between the sub-common electrode CB, on the one hand, and the first sub-pixel electrode PB and second sub-pixel electrode PC, on the other hand. In short, the sub-common electrode CB is located at a substantially middle point between the first sub-pixel electrode PB and second sub-pixel electrode PC.

In the example illustrated, each main common electrode CA is formed in a strip shape linearly extending in the second direction Y. The sub-common electrode CB is formed in a strip shape linearly extending in the first direction X. In the meantime, two main common electrodes CA are arranged in parallel with an interval in the first direction X. In the description below, in order to distinguish these main common electrodes CA, the main common electrode located on the left side in the Figure is referred to as "CAL", and the main common electrode located on the right side is referred to as "CAR". The main common electrode CAL and main common electrode CAR have the same potential as the sub-common electrode CB. In the example illustrated, the main common electrode CAL and main common electrode CAR are continuous with the sub-common electrode CB.

The main common electrode CAL and main common electrode CAR are disposed, respectively, between the present pixel PX and pixels neighboring this pixel on left and right sides. Specifically, the main common electrode CAL is disposed to extend over a boundary between the illustrated pixel PX and a pixel (not shown) neighboring on the left side thereof, and the main common electrode CAR is disposed to extend over a boundary between the illustrated pixel PX and a pixel (not shown) neighboring on the right side thereof.

The sub-common electrode CB crosses a substantially central part of the pixel PX.

One main pixel electrode PA is located between the neighboring main common electrode CAL and main common electrode CAR. Thus, the main common electrode CAL, main pixel electrode PA and main common electrode CAR are arranged in the named order in the first direction X. Specifically, the main pixel electrode PA and main common electrodes CA are alternately arranged in the first direction X. The main pixel electrode PA, main common electrode CAL and main common electrode CAR are arranged substantially in parallel to each other. In addition, the distance between the main common electrode CAL and main pixel electrode PA in the first direction X is substantially equal to the distance between the main common electrode CAR and main pixel electrode PA in the first direction X.

One sub-common electrode CB is located between the neighboring first sub-pixel electrode PB and second sub-pixel electrode PC. Thus, the first sub-pixel electrode PB, sub-common electrode CB and second sub-pixel electrode PC are arranged in the named order in the second direction Y. Specifically, the first sub-pixel electrode PB, second sub-pixel electrode PC and sub-common electrode CB are alternately arranged in the second direction Y. The first sub-pixel electrode PB, sub-common electrode CB and second sub-pixel electrode PC are arranged substantially in parallel to each other. In addition, the distance between the first sub-pixel electrode PB and sub-common electrode CB in the second direction Y is substantially equal to the distance between the second sub-pixel electrode PC and sub-common electrode CB in the second direction Y.

Specifically, in the example illustrated, in one pixel PX, four regions, which are divided by the pixel electrode PE and common electrode CE, are formed as aperture portions or transmissive parts which mainly contribute to display.

In the example illustrated, the initial alignment direction of liquid crystal molecules LM is, for example, a direction which is substantially parallel to the second direction Y.

Although not described here in detail, at least one of the main common electrodes CA may be opposed to a source line S which extends substantially parallel to the main common electrodes CA (or extending in the second direction Y). In addition, one of the first sub-pixel electrode PB, second sub-pixel electrode PC and sub-common electrode CB may be opposed to a gate line G or storage capacitance line C which extends substantially parallel to these electrodes (or extending in the first direction X).

Besides, as will be described later, the main common electrodes CA may include at least one of a first main common electrode CA1 which is provided on the array substrate AR, and a second main common electrode CA2 which is provided on the counter-substrate CT. In addition, the sub-common electrode CB may include at least one of a first sub-common electrode CB1 which is provided on the array substrate AR, and a second sub-common electrode CB2 which is provided on the counter-substrate CT. The first main common electrode CA1, second main common electrode CA2, first sub-common electrode CB1 and second sub-common electrode CB2 have the same potential.

FIG. 4 is a schematic cross-sectional view showing a cross section of the liquid crystal display LPN including a switching element SW. The depiction of the common electrode is omitted, and only the parts necessary for the description are illustrated.

A backlight 4 is disposed on the back side of the array substrate AR which constitutes the liquid crystal display panel LPN.

The array substrate AR is formed by using a first insulative substrate 10 having light transmissivity, such as a glass substrate or a plastic substrate. The array substrate AR includes a switching element SW, a pixel electrode PE and a first alignment film AL1 on that side of the first insulative substrate 10, which is opposed to the counter-substrate CT.

In the example illustrated, the switching element SW is a top-gate-type thin-film transistor, but it may be a bottom-gate-type thin-film transistor. In addition, although a semiconductor layer SC of the switching element SW is formed of, for example, polysilicon, it may be formed of amorphous silicon.

The semiconductor layer SC includes a source region SCS and a drain region SCD on both sides of a channel region SCC. Incidentally, an undercoat layer, which is an insulation film, may be provided between the first insulative substrate 10 and the semiconductor layer SC. The semiconductor layer SC is covered with a gate insulation film 11. In addition, the gate insulation film 11 is also disposed on the first insulative substrate 10.

A gate electrode WG of the switching element SW is formed on the gate insulation film 11, and is located above the channel region SCC of the semiconductor layer SC. A gate line G and a storage capacitance line C are also formed on the gate insulation film 11. The gate electrode WG, gate line G and storage capacitance line C can be formed of the same material in the same fabrication step. The gate electrode WG is electrically connected to the gate line G.

The gate electrode WG, gate line G and storage capacitance line C are covered with a first interlayer insulation film 12. In addition, the first interlayer insulation film 12 is also disposed on the gate insulation film 11. The gate insulation film 11 and first interlayer insulation film 12 are formed of, for example, an inorganic material such as silicon oxide and silicon nitride.

A source electrode WS and a drain electrode WD of the switching element SW are formed on the first interlayer insulation film 12. A source line S is also formed on the first interlayer insulation film 12. The source electrode WS, drain electrode WD and source line S can be formed of the same material in the same fabrication step. The source electrode WS is electrically connected to the source line S.

The source electrode WS is put in contact with the source region SCS of the semiconductor layer SC via a contact hole which penetrates the gate insulation film 11 and first interlayer insulation film 12. The drain electrode WD is put in contact with the drain region SCD of the semiconductor layer SC via a contact hole which penetrates the gate insulation film 11 and first interlayer insulation film 12. The gate electrode WG, gate line G, storage capacitance line C, source electrode WS, drain electrode WD and source line S are formed of electrically conductive materials such as molybdenum, aluminum, tungsten and titanium.

The switching element SW with this structure is covered with a second interlayer insulation film 13. Specifically, the source electrode WS, drain electrode WD and source line S are covered with a second interlayer insulation film 13. In addition, the second interlayer insulation film 13 is also disposed on the first interlayer insulation film 12. The second interlayer insulation film 13 is formed of, for example, various organic materials such as an ultraviolet-curing resin and a thermosetting resin.

The pixel electrode PE is formed on the second interlayer insulation film 13. Although not described in detail, the main pixel electrode PA, first sub-pixel electrode PB and second sub-pixel electrode PC, which constitute the pixel electrode PE, are formed on the second interlayer insulation film 13. The pixel electrode PE is electrically connected to the drain electrode WD via a contact hole which penetrates the second interlayer insulation film 13. Although the pixel electrode PE is formed of a light-transmissive, electrically conductive material such as indium tin oxide (ITO) or indium zinc oxide (IZO), it may be formed of other metallic material such as aluminum.

The first alignment film AL1 is disposed on that surface of the array substrate AR, which is opposed to the counter-substrate CT, and extends over substantially the entirety of the active area ACT. The first alignment film AL1 covers the pixel electrode PE, and is also disposed on the second interlayer insulation film 13. The first alignment film AL1 is formed of a material which exhibits horizontal alignment properties.

In the meantime, there may be a case in which the array substrate AR further includes a first main common electrode and a first sub-common electrode as a part of the common electrode.

On the other hand, the counter-substrate CT is formed by using a second insulative substrate 20 with light transmissivity, such as a glass substrate or a plastic substrate. The counter-substrate CT includes, on that side of the second insulative substrate 20 which is opposed to the array substrate AR, at least one of a second main common electrode and a second sub-common electrode of the common electrode, the depiction of which is omitted, and a second alignment film AL2. In addition, although not illustrated, a black matrix which partitions pixels PX (or is disposed to be opposed to wiring portions such as source lines S, gate lines G, storage capacitance lines C and switching elements SW), color filter layers which are disposed in association with the respective pixels PX, and an overcoat layer, which reduces the effect of asperities on the surfaces of the black matrix and color filter layers, may be disposed on the counter-substrate CT.

The common electrode is formed of, for example, a light-transmissive, electrically conductive material such as ITO or IZO.

The second alignment film AL2 is disposed on that surface of the counter-substrate CT, which is opposed to the array substrate AR, and extends over substantially the entirety of the active area ACT. The second alignment film AL2 covers the common electrode, etc. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning liquid crystal molecules LM. A first alignment treatment direction PD1, in which the first alignment film AL1 initially aligns the liquid crystal molecules LM, is parallel to a second alignment treatment direction PD2, in which the second alignment film AL2 initially aligns the liquid crystal molecules LM. In an example illustrated in part (A) of FIG. 3, the first alignment treatment direction PD1 and second alignment treatment direction PD2 are substantially parallel to each other, and are identical. In an example illustrated in part (B) of FIG. 3, the first alignment treatment direction PD1 and second alignment treatment direction PD2 are substantially parallel to each other, and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached by, e.g. an adhesive, to an outer surface of the array substrate AR, that is, an outer surface of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to the initial alignment direction of liquid crystal molecules LM, that is, the first alignment treatment direction PD1 or second alignment treatment direction PD2. When the initial alignment direction is parallel to the second direction Y, the polarization axis of one of the polarizers is parallel to the second direction Y, or is parallel to the first direction X.

In an example shown in part (a) of FIG. 3, the first polarizer PL1 is disposed such that the first polarization axis AX1 thereof is perpendicular to the second direction Y that is the initial alignment direction of liquid crystal molecules LM, and the second polarizer PL2 is disposed such that the second polarization axis AX2 thereof is parallel to the initial alignment direction of liquid crystal molecules LM. In addition, in an example shown in part (b) of FIG. 3, the second polarizer PL2 is disposed such that the second polarization axis AX2 thereof is perpendicular to the second direction Y that is the initial alignment direction of liquid crystal molecules LM, and the first polarizer PL1 is disposed such that the first polarization axis AX1 thereof is parallel to the initial alignment direction of liquid crystal molecules LM.

Thereby, a normally black mode is realized.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE and common electrode CE, the liquid crystal molecules LM of the liquid crystal layer LQ are aligned such that the major axes thereof are positioned in the first alignment treatment direction PD1 of the first alignment film AL1 and the second alignment treatment direction PD2 of the second alignment film AL2, as indicated by broken lines in FIG. 3. This OFF time corresponds to the initial alignment state, and the alignment direction of the liquid crystal molecules LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM is, in the strict sense, a direction in which the alignment direction of the liquid crystal molecule LM at the OFF time is orthogonally projected onto the X-Y plane. However, in the description below, for the purpose of simplicity, it is assumed that the liquid crystal molecule LM are aligned in parallel to the X-Y plane, and the liquid crystal molecules LM rotate in a plane parallel to the X-Y plane.

In this example, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3. Specifically, the initial alignment direction of the liquid crystal molecule LM is parallel to the second direction Y (or is at 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be enhanced.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1, and enters the liquid crystal display panel LPN. The light, which enters the liquid crystal display panel LPN, is linearly polarized light which is perpendicular to the first polarization axis AX1 of the first polarizer PL1. The polarization state of such linearly polarized light hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, in the region between the pixel electrode PE and the main common electrode CAL, the liquid crystal molecule LM in the upper half part of this region rotates clockwise relative to the second direction Y, and is aligned in a lower left direction in the Figure, and the liquid crystal molecule LM in the lower half part of this region rotates counterclockwise relative to the second direction Y, and is aligned in an upper left direction in the Figure. In the region between the pixel electrode PE and the main common electrode CAR, the liquid crystal molecule LM in the upper half part of this region rotates counterclockwise relative to the second direction Y, and is aligned in a lower right direction in the Figure, and the liquid crystal molecule LM in the lower half part of this region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, linearly polarized light, which is perpendicular to the first polarization AX1 of the first polarizer PL1, enters the liquid crystal display panel LPN, and the polarization state of such linearly polarized light varies depending on the alignment state of the liquid crystal molecules LM when the light passes through the liquid crystal layer LQ. At this ON time, at least part of the light emerging from the liquid crystal layer LQ passes through the second polarizer PL2 (white display).

According to the present embodiment, four domains can be formed in one pixel. Thus, the viewing angle can optically be compensated in four directions, and a wider viewing angle can be realized. Therefore, it is possible to provide a liquid crystal display device with good display quality, which is free from gray level inversion and can realize high-transmittance display.

In addition, the four regions, which are divided by the pixel electrode PE and common electrode CE in one pixel, are set to have substantially equal areas of aperture portions. Thereby, the transmittances of the respective regions become substantially equal, light components passing through the respective aperture portions optically compensate each other, and uniform display can be realized over a wide viewing-angle range.

Compared to a vertical alignment-type liquid crystal display device in which the initial alignment state of liquid crystal molecules is vertical to the substrate, it was confirmed that in the present embodiment the viewing angle is wide and the brightness is high even at intermediate gray levels.

At the ON time, a lateral electric field is hardly produced (or an electric field enough to drive liquid crystal molecules LM is not produced) near the main pixel electrode PA of pixel electrode PE, near the first sub-pixel electrode PB and near the second sub-pixel electrode PC, or near the main common electrodes CA of common electrode CE and near the sub-common electrode CB. Thus, the liquid crystal molecules LM scarcely move from the initial alignment direction, like the case of the OFF time. Thus, even if the pixel electrode PE and common electrode CE are formed of a light-transmissive, electrically conductive material, as described above, little backlight passes through these regions, and these regions hardly contribute to display at the ON time. Thus, the pixel electrode PE and common electrode CE do not necessarily need to be formed of a transparent, electrically conductive material, and may be formed of an electrically conductive material such as aluminum or silver.

In addition, when misalignment has occurred between the array substrate AR and the counter-substrate CT, there is a case in which the distances between the pixel electrode PE, on the one hand, and the common electrodes CE on both sides of the pixel electrode PE, on the other hand, becomes different. However, since such a difference occurs commonly in all pixels PX, the electric field distribution does not differ between the pixels PX, and the influence on the display of images is very small.

The above-described minimum unit structure in one pixel may have a square shape, or may have any other rectangular shape with no restrictions on the increase/decrease in dimension in the second direction Y or in the first direction X. Specifically, a desired pixel size can be designed by the unit structure itself or by a combination of unit structures. Even if the dimensions of the unit structure are freely designed, since the liquid crystal molecules LM are aligned horizontal to the substrate by the electric field produced between the electrodes, there is little influence on the retardation in the normal direction to the substrate. Therefore, a change in pixel size hardly affects the brightness and viewing angle.

On the other hand, in the case of the vertical alignment-type liquid crystal display device in which the initial alignment state is vertical to the substrate and is made horizontal by an application voltage, if the intensity of the electric field which is produced between the electrodes is different among pixels, the degree of inclination of liquid crystal molecules to the substrate is also different, and thus the influence on the retardation in the normal direction to the substrate is great. Therefore, the change in pixel size greatly affects the brightness and viewing angle. From this, if the vertical alignment-type liquid crystal molecules are applied to this unit structure, it is necessary to form the unit structure in a square shape, thereby to make uniform the electric field intensity and electric field distribution in the pixel.

Next, structure examples of the embodiment will be described.

First Structure Example

To begin with, a first structure example of the embodiment is described.

Figure 5:
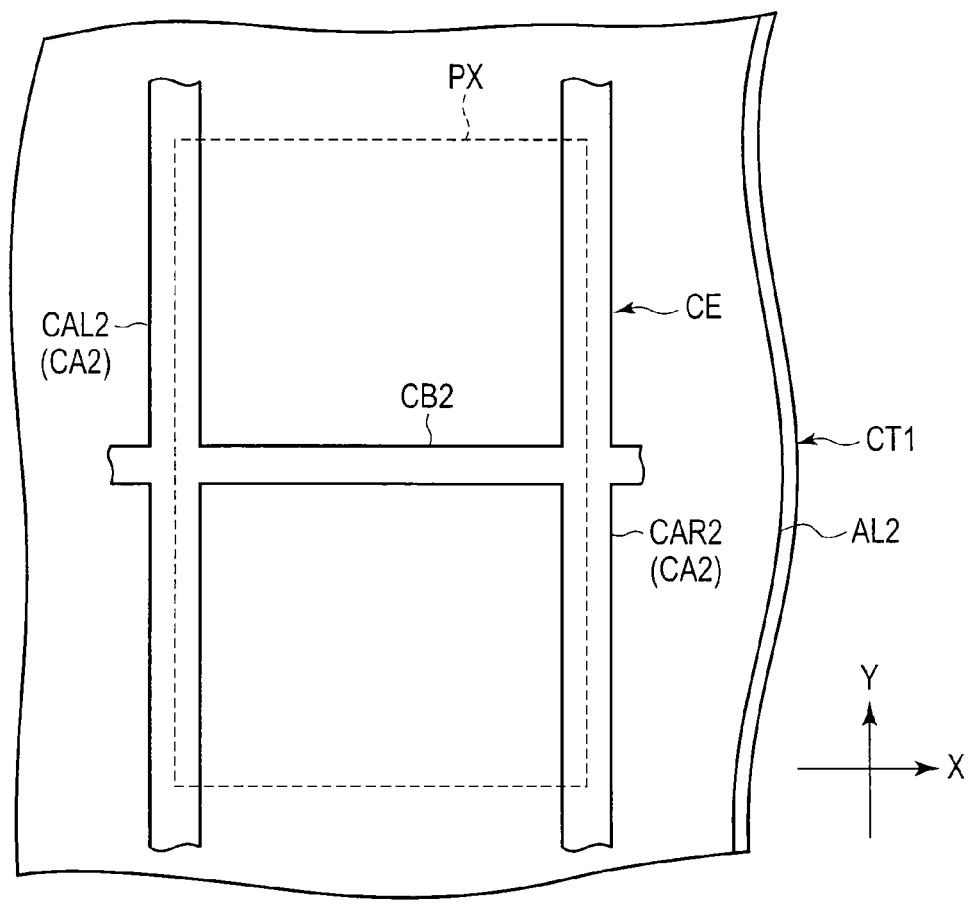
FIG. 5 is a plan view which schematically shows the structure of one pixel on a counter-substrate of a liquid crystal display panel in a first structure example of the embodiment.

FIG. 5 is a plan view which schematically shows the structure of one pixel PX on a counter-substrate CT1 of a liquid crystal display panel LPN in the first structure example of the embodiment.

In the first structure example, a common electrode CE includes second main common electrodes CA2 which are provided on a counter-substrate CT1 as main common electrodes, and a second sub-common electrode CB2 which is provided on the counter-substrate CT1 as a sub-common electrode. The second main common electrodes CA2 and second sub-common electrode CB2 are covered with a second alignment film AL2.

Specifically, the illustrated counter-substrate CT1 includes second main common electrodes CA2 each having a strip shape linearly extending in the second direction Y, and a second sub-common electrode CB2 having a strip shape linearly extending in the first direction X. The second main common electrodes CA2 and the second sub-common electrode CB2 are electrically connected. In the example illustrated, the second main common electrodes CA2 and second sub-common electrode CB2 are formed integral (or continuous) with each other. In short, in the counter-substrate CT1, the common electrode CE is formed in a grid shape.

In the meantime, the illustrated second main common electrodes CA2 are two second main common electrodes CA2 which are arranged in parallel with an interval in the first direction X. In the description below, in order to distinguish these second main common electrodes CA2, the second main common electrode located on the left side in the Figure is referred to as "CAL2", and the second main common electrode located on the right side is referred to as "CAR2". The second main common electrode CAL2 and second main common electrode CAR2 are continuous with the second sub-common electrode CB2.

Although not described in detail, the common electrode CE with this structure is led out to the outside of the active area, is electrically connected to a power supply module formed on an array substrate via an electrically conductive member, and is supplied with a common potential.

Next, a description is given of an array substrate AR1 which is suitably combined with the counter-substrate CT1 shown in FIG. 5.

Figure 6:
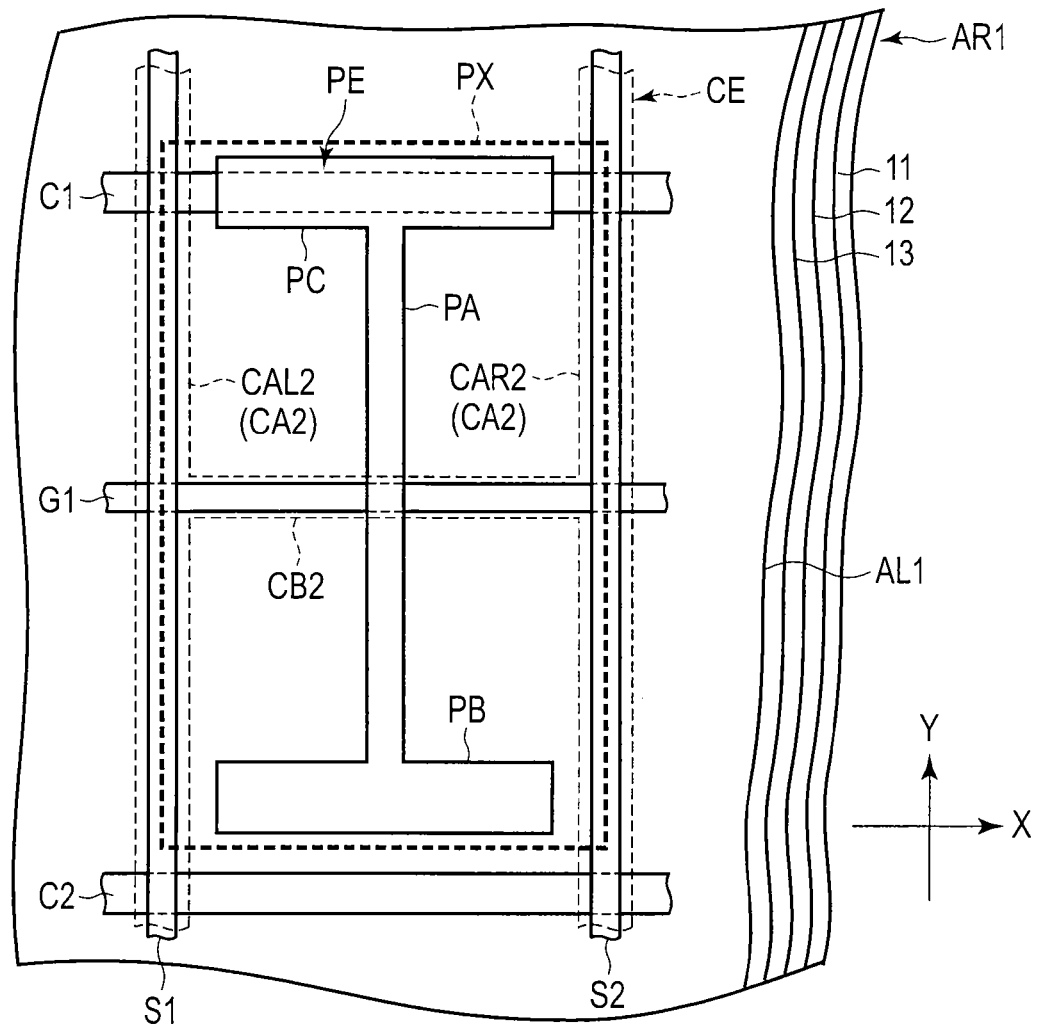
FIG. 6 is a plan view which schematically shows the structure of an array substrate, at a time when the pixel of the liquid crystal display panel in the first structure example of the embodiment is viewed from the counter-substrate side.

FIG. 6 is a plan view which schematically shows the structure of the array substrate AR1, at a time when the pixel PX of the liquid crystal display panel LPN in the first structure example of the embodiment is viewed from the counter-substrate CT1 side. The common electrode CE is illustrated by broken lines, in order to explain the positional relationship between the pixel electrode PE and common electrode CE. In addition, only the structure of the pixel PX, which is necessary for the description, is illustrated, and the depiction of a switching element, etc. is omitted.

The array substrate AR1 includes a storage capacitance line C1 and a storage capacitance line C2 which extend in the first direction X, a gate line G1 extending in the first direction X, a source line S1 and a source line S2 which extend in the second direction Y, and a pixel electrode PE. The storage capacitance line C1, storage capacitance line C2 and gate line G1 are formed on the gate insulation film 11 and are covered with the first interlayer insulation film 12. The source line S1 and source line S2 are formed on the first interlayer insulation film 12 and are covered with the second interlayer insulation film 13. The pixel electrode PE is formed on the second interlayer insulation film 13.

In the example illustrated, the pixel PX corresponds to an area indicated by a broken line, and has a rectangular shape having a greater length in the second direction Y than in the first direction X. In addition, in the illustrated example, in the pixel PX, the source line S1 is disposed at a left side end portion, and the source line S2 is disposed at a right side end portion. Strictly speaking, the source line S1 is disposed to extend over a boundary between the pixel PX and a pixel neighboring on the left side, and the source line S2 is disposed to extend over a boundary between the pixel PX and a pixel neighboring on the right side. In addition, in the pixel PX, the storage capacitance line C1 is disposed at an upper side end portion, the storage capacitance line C2 is disposed at a lower side end portion, and the gate line G1 is disposed at a substantially central part of the pixel. Specifically, the distance in the second direction Y between the gate line G1 and the storage capacitance line C1 is substantially equal to the distance in the second direction Y between the gate line G1 and the storage capacitance line C2. Incidentally, the storage capacitance line C1 may be disposed over a boundary between the present pixel PX and a pixel neighboring on the upper side. Similarly, the storage capacitance line C2 may be disposed over a boundary between the present pixel PX and a pixel neighboring on the lower side.

The pixel electrode PE is disposed between the source line S1 and source line S2 and is electrically connected to the switching element (not shown). The pixel electrode PE includes a main pixel electrode PA having a strip shape linearly extending in the second direction Y, and a first sub-pixel electrode PB and a second sub-pixel electrode PC each having a strip shape linearly extending in the first direction X. The main pixel electrode PA, first sub-pixel electrode PB and second sub-pixel electrode PC are electrically connected. In the example illustrated, the main pixel electrode PA, first sub-pixel electrode PB and second sub-pixel electrode PC are formed integral (or continuous) with each other. In short, in the array substrate AR1, the pixel electrode PE is formed in an I-shape. In addition, the main pixel electrode PA, first sub-pixel electrode PB and second sub-pixel electrode PC are covered with the first alignment film AL1.

The main pixel electrode PA is located, within the pixel PX, at a position inside the positions immediately above the neighboring source line S1 and source line S2, and is disposed at a substantially middle point between the source line S1 and source line S2. The main pixel electrode PA extends from the vicinity of the upper side end portion of the pixel PX to the lower side end portion thereof.

The first sub-pixel electrode PB is disposed at the lower side end portion of the pixel PX and is continuous with one end portion of the main pixel electrode PA. The first sub-pixel electrode PB linearly extends from the main pixel electrode PA toward both sides thereof, that is, toward the source line S1 on the left side of the main pixel electrode PA and the source line S2 on the right side of the main pixel electrode PA.

The second sub-pixel electrode PC is disposed at the upper side end portion of the pixel PX and is continuous with the other end portion of the main pixel electrode PA. The second sub-pixel electrode PC linearly extends from the main pixel electrode PA toward both sides thereof, that is, toward the source line S1 and the source line S2. In the first structure example, the second sub-pixel electrode PC is opposed to the storage capacitance line C1. In the example illustrated, the second sub-pixel electrode PC is disposed above the storage capacitance line C1. The first interlayer insulation film 12 and second interlayer insulation film 13 are interposed as insulation films between the second sub-pixel electrode PC and storage capacitance line C1.

The lengths in the first direction X of the first sub-pixel electrode PB and second sub-pixel electrode PC may be substantially equal or may be different. As regards the length in the first direction X of the second sub-pixel electrode PC, when the second sub-pixel electrode PC covers the storage capacitance line C1, the length in the first direction X of the second sub-pixel electrode PC is equal to or greater than the length in the first direction X of the storage capacitance line C1 which is located between the source line S1 and source line S2.

In addition, the widths in the second direction Y of the first sub-pixel electrode PB and second sub-pixel electrode PC may be substantially equal or may be different. As regards the width of the second sub-pixel electrode PC, when the second sub-pixel electrode PC is configured to be electrically connected to the switching element (not shown) on the storage capacitance line C1, the width of the second sub-pixel electrode PC may be greater than the width of the first sub-pixel electrode PB. When the second sub-pixel electrode PC covers the storage capacitance line C1, the width of the second sub-pixel electrode PC is equal to or greater than the width of the storage capacitance line C1.

In the structure in which the storage capacitance line C1 is disposed at the upper side end portion of the pixel PX and the gate line G1 is disposed at a substantially central part of the pixel, as described above, the second sub-pixel electrode PC can be disposed in a manner to cover the storage capacitance line C1 which is located between the source line S1 and source line S2. In the meantime, in the structure in which the storage capacitance line C2 is disposed at the lower side end portion of the pixel, the first sub-pixel electrode PB can be disposed in a manner to cover the storage capacitance line C2 which is located between the source line S1 and source line S2.

In addition, the first sub-pixel electrode PB and second sub-pixel electrode PC of two pixel electrodes, which neighbor in the second direction Y, may be disposed on one storage capacitance line. For example, the second sub-pixel electrode PC of the pixel electrode PE of the illustrated pixel PX, and the first sub-pixel electrode PB of a pixel electrode, which is disposed in a pixel on the upper side of this pixel PX, may be disposed on the storage capacitance line C1. In this case, the first sub-pixel electrode PB of the pixel electrode PE of the pixel PX is disposed on the storage capacitance line C2.

Besides, the gate line G1 may be disposed at the upper side end portion or lower side end portion of the pixel PX, and the storage capacitance line C1 may be disposed at a substantially central part of the pixel. In this case, the first sub-pixel electrode PB or second sub-pixel electrode PC may be opposed to the gate line G1 (or the first sub-pixel electrode PB or second sub-pixel electrode PC may be disposed above the gate line G1).

On the other hand, in the common electrode CE, the second main common electrode CAL2 and second main common electrode CAR2 are disposed on both sides of a position immediately above the main pixel electrode PA. The second sub-common electrode CB2 is disposed between a position immediately above the first sub-pixel electrode PB and a position immediately above the second sub-pixel electrode PC. In other words, the main pixel electrode PA is disposed between the second main common electrode CAL2 and second main common electrode CAR2, and the first sub-pixel electrode PB and second sub-pixel electrode PC are disposed on both sides of the second sub-common electrode CB2.

In the example illustrated, the second main common electrode CAL2 is disposed at the left side end portion of the pixel PX and is opposed to the source line S1 (or the second main common electrode CAL2 is disposed above the source line S1). In addition, the second main common electrode CAR2 is disposed at the right side end portion of the pixel PX and is opposed to the source line S2 (or the second main common electrode CAR2 is disposed above the source line S2). The second sub-common electrode CB2 is disposed at a substantially central part of the pixel and is opposed to the gate line G1 (or the second sub-common electrode CB2 is disposed above the gate line G1).

According to the first structure example, as described above, since four domains can be formed in one pixel, the viewing angle can optically be compensated in four directions, and a wider viewing angle can be realized.

The second main common electrode CAL2 and second main common electrode CAR2 are opposed to the source line S1 and source line S2, respectively. In particular, when the second main common electrode CAL2 and second main common electrode CAR2 are disposed above the source line S1 and source line S2, respectively, the aperture portions which contribute to display can be made larger, compared to the case in which the second main common electrode CAL2 and second main common electrode CAR2 are disposed on the main pixel electrode PA side of the source line S1 and source line S2, and the transmittance of the pixel PX can be enhanced.

In addition, by disposing the second main common electrode CAL2 and second main common electrode CAR2 above the source line S1 and source line S2, respectively, the distances between the main pixel electrode PA, on the one hand, and the second main common electrode CAL2 and second main common electrode CAR2, on the other hand, can be increased, and a lateral electric field, which is closer to a horizontal electric field, can be produced. Therefore, a wider viewing angle, which is an advantage of, e.g. the IPS mode of the conventional configuration, can be maintained.

Furthermore, since the first sub-pixel electrode PB or second sub-pixel electrode PC of the pixel electrode PE is disposed to be opposed to the storage capacitance line or gate line, an undesired electric field from the storage capacitance line or gate line can be shielded. It is thus possible to suppress application of an undesired bias from the storage capacitance line or gate line to the liquid crystal layer LQ, and to suppress the occurrence of a display defect such as burn-in. Therefore, a liquid crystal display device with a higher display quality can be provided.

Second Structure Example

Next, a second structure example of the embodiment is described. The same structural parts as in the first structure example are denoted by like reference numerals, and a detailed description is omitted.

FIG. 7 is a plan view which schematically shows the structure of one pixel PX on a counter-substrate CT2 of a liquid crystal display panel LPN in the second structure example of the embodiment.

In the second structure example, a common electrode CE includes first main common electrodes CA1 which are provided as main common electrodes on an array substrate that will be described later, and a second sub-common electrode CB2 which is provided on a counter-substrate CT2 as a sub-common electrode. The second sub-common electrode CB2 is covered with a second alignment film AL2.

Specifically, the illustrated counter-substrate CT2 includes the second sub-common electrode CB2 having a strip shape linearly extending in the first direction X, but does not include a main common electrode. In other words, in the counter-substrate CT2, the common electrode CE is formed in a stripe shape extending in the first direction X.

Although not described in detail, the second sub-common electrode CB2 of the common electrode CE is led out to the outside of the active area, is electrically connected to a power supply module formed on the array substrate via an electrically conductive member, and is supplied with a common potential.

Next, a description is given of an array substrate AR2 which is suitably combined with the counter-substrate CT2 shown in FIG. 7.

Figure 8:
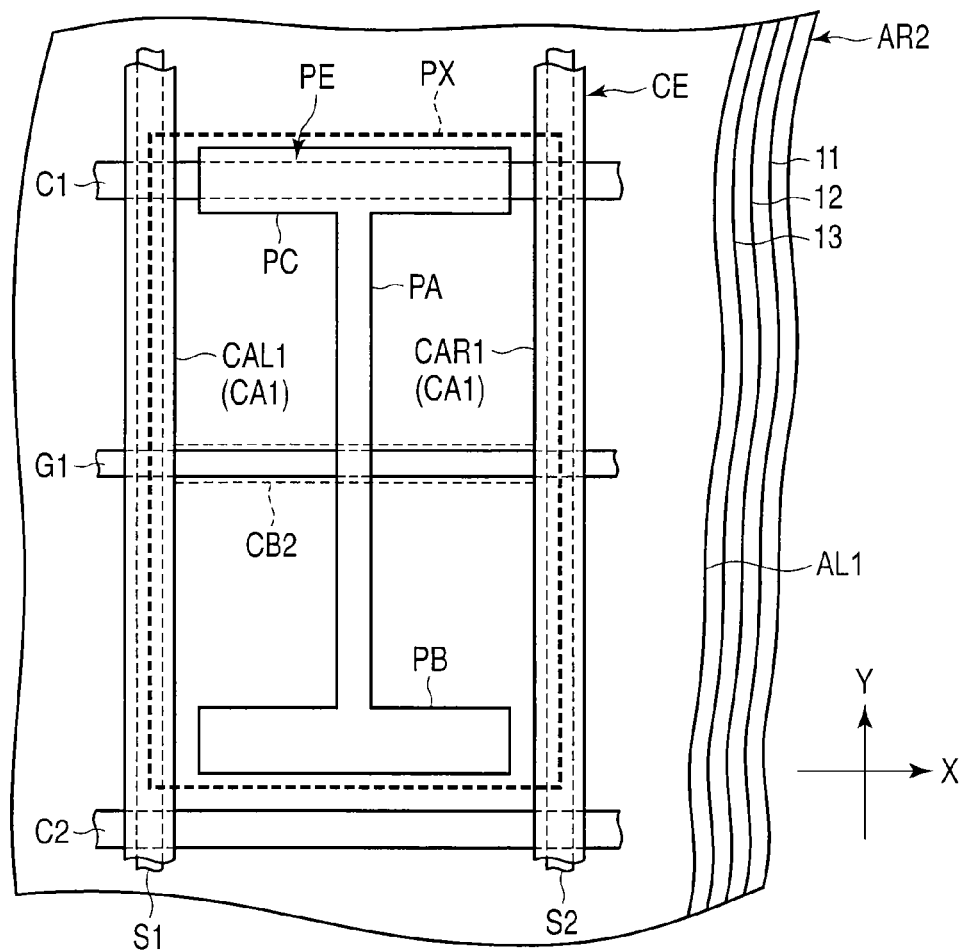
FIG. 8 is a plan view which schematically shows the structure of an array substrate, at a time when the pixel of the liquid crystal display panel in the second structure example of the embodiment is viewed from the counter-substrate side.

FIG. 8 is a plan view which schematically shows the structure of the array substrate AR2, at a time when the pixel PX of the liquid crystal display panel LPN in the second structure example of the embodiment is viewed from the counter-substrate CT2 side. The common electrode CE is illustrated by broken lines, in order to explain the positional relationship between the pixel electrode PE and common electrode CE. In addition, only the structure of the pixel PX, which is necessary for the description, is illustrated, and the depiction of a switching element, etc. is omitted.

The array substrate AR2, like the array substrate AR1, includes a storage capacitance line C1 and a storage capacitance line C2 which extend in the first direction X, a gate line G1 extending in the first direction X, a source line S1 and a source line S2 which extend in the second direction Y, and a pixel electrode PE. The pixel electrode PE is covered with the first alignment film AL1. In addition, the array substrate AR2 includes a part of the common electrode CE, that is, first main common electrodes CA1 each having a strip shape linearly extending in the second direction Y. The first main common electrodes CA1 have the same potential as the second sub-common electrode CB2.

In the meantime, the illustrated first main common electrodes CA1 are two first main common electrodes CA1 which are arranged in parallel with an interval in the first direction X. In the description below, in order to distinguish these first main common electrodes CA1, the first main common electrode located on the left side in the Figure is referred to as "CAL1", and the first main common electrode located on the right side is referred to as "CAR1". For example, like the pixel electrode PE, the first main common electrode CAL1 and first main common electrode CAR1 are formed on the second interlayer insulation film 13, and are covered with the first alignment film AL1. In this case, the first main common electrode CAL1 and first main common electrode CAR1 can be formed of the same material (e.g. ITO) as the pixel electrode PE in the same fabrication step.

In the example illustrated, the first main common electrode CAL1 is disposed at the left side end portion of the pixel PX, and is opposed to the source line S1 (or the first main common electrode CAL1 is disposed above the source line S1). In addition, the first main common electrode CAR1 is disposed at the right side end portion of the pixel PX, and is opposed to the source line S2 (or the first main common electrode CAR1 is disposed above the source line S2). The second interlayer insulation film 13 is interposed as an insulation film between the first main common electrode CAL1 and first main common electrode CAR1, on the one hand, and the source line S1 and source line S2, on the other hand.

The first main common electrode CAL1 and first main common electrode CAR1 linearly extend within the active area, are led out of the active area, are electrically connected to the power supply module formed on the array substrate AR2, and are supplied with a common potential. In addition, in the case where the first main common electrode CAL1 and first main common electrode CAR1 cover the source line S1 and source line S2 in the active area, the width in the first direction X of each of the first main common electrode CAL1 and first main common electrode CAR1 is equal to or greater than the width in the first direction X of each of the source line S1 and source line S2.

Like the first structure example, the pixel electrode PE is disposed between the source line S1 and source line S2, that is, between the first main common electrode CAL1 and first main common electrode CAR1. The pixel electrode PE includes the main pixel electrode PA, first sub-pixel electrode PB and second sub-pixel electrode PC.

The main pixel electrode PA is located at a substantially middle point between the first main common electrodes CAL1 and first main common electrodes CAR1. Each of the first sub-pixel electrode PB and second sub-pixel electrode PC extends toward the first main common electrodes CAL1 and first main common electrodes CAR1. However, in the case where the pixel electrode PE, together with the first main common electrodes CAL1 and first main common electrodes CAR1, is formed on the second interlayer insulation film 13, each of the first sub-pixel electrode PB and second sub-pixel electrode PC is disposed so as not to come in contact with the first main common electrodes CAL1 and first main common electrodes CAR1 (or each of the first sub-pixel electrode PB and second sub-pixel electrode PC is disposed so as to be spaced apart from the first main common electrodes CAL1 and first main common electrodes CAR1).

The second sub-pixel electrode PC is opposed to the storage capacitance line C1 (or the second sub-pixel electrode PC is disposed above the storage capacitance line C1).

In the meantime, the gate line G1 may be disposed at the upper side end portion or lower side end portion of the pixel PX, and the storage capacitance line C1 may be disposed at a substantially central part of the pixel. In this case, the first sub-pixel electrode PB or second sub-pixel electrode PC may be opposed to the gate line G1 (or the first sub-pixel electrode PB or second sub-pixel electrode PC may be disposed above the gate line G1).

On the other hand, in the common electrode CE, the second sub-common electrode CB2 is disposed between a position immediately above the first sub-pixel electrode PB and a position immediately above the second sub-pixel electrode PC. In other words, the main pixel electrode PA is disposed between the first main common electrode CAL1 and first main common electrode CAR1, and the first sub-pixel electrode PB and second sub-pixel electrode PC are disposed on both sides of the second sub-common electrode CB2.

In the example illustrated, the second sub-common electrode CB2 is disposed at a substantially central part of the pixel and is opposed to the gate line G1 (or the second sub-common electrode CB2 is disposed above the gate line G1).

According to the second structure example, as described above, since four domains can be formed in one pixel, the viewing angle can optically be compensated in four directions, and a wider viewing angle can be realized. Furthermore, in addition to the advantageous effects described in connection with the first structure example, since at least one of the first main common electrodes CA1 of the common electrode CE is so disposed as to be opposed to the source line, an undesired electric field from the source line can be shielded. It is thus possible to suppress application of an undesired bias from the source line to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases). Therefore, a liquid crystal display device with a higher display quality can be provided.

In the meantime, the array substrate AR2, which has been described in connection with the second structure example, may be combined with the counter-substrate CT1 which was described in connection with the first structure example. In this case, the common electrode CE is configured to include, as the main common electrode, the first main common electrodes CA1 provided on the array substrate AR2 and the second main common electrodes CA2 provided on the counter-substrate CT1. In regions where the first main common electrodes CA1 and the second main common electrodes CA2 are opposed to each other with the liquid crystal layer being interposed, it becomes possible to suppress the occurrence of an undesired vertical electric field (i.e. an electric field in a direction normal to the substrate major surface).

Third Structure Example

Next, a third structure example of the embodiment is described. The same structural parts as in the first structure example are denoted by like reference numerals, and a detailed description is omitted.

FIG. 9 is a plan view which schematically shows the structure of one pixel PX on a counter-substrate CT3 of a liquid crystal display panel LPN in the third structure example of the embodiment.

In the third structure example, a common electrode CE includes second main common electrodes CA2 which are provided as main common electrodes on a counter-substrate CT3, and a first sub-common electrode CB1 which is provided as a sub-common electrode on an array substrate that will be described later. The second main common electrodes CA2 are covered with a second alignment film AL2.

Specifically, the illustrated counter-substrate CT3 includes the second main common electrodes CA2 each having a strip shape linearly extending in the second direction Y, but does not include a sub-common electrode. In other words, in the counter-substrate CT3, the common electrode CE is formed in a stripe shape extending in the second direction Y. In the meantime, the illustrated second main common electrodes CA2 are two second main common electrodes CA2 which are arranged in parallel with an interval in the first direction X. In the description below, in order to distinguish these second main common electrodes CA2, the second main common electrode located on the left side in the Figure is referred to as "CAL2", and the second main common electrode located on the right side is referred to as "CAR2".

Although not described in detail, the second main common electrodes CA2 of the common electrode CE are led out to the outside of the active area, are electrically connected to a power supply module formed on an array substrate via an electrically conductive member, and are supplied with a common potential.

Next, a description is given of an array substrate AR3 which is suitably combined with the counter-substrate CT3 shown in FIG. 9.

FIG. 10 is a plan view which schematically shows the structure of the array substrate AR3, at a time when the pixel PX of the liquid crystal display panel LPN in the third structure example of the embodiment is viewed from the counter-substrate CT3 side. The common electrode CE is illustrated by broken lines, in order to explain the positional relationship between the pixel electrode PE and common electrode CE. In addition, only the structure of the pixel PX, which is necessary for the description, is illustrated, and the depiction of a switching element, etc. is omitted.

The array substrate AR3, like the array substrate AR1, includes a storage capacitance line C1 and a storage capacitance line C2 which extend in the first direction X, a gate line G1 extending in the first direction X, a source line S1 and a source line S2 which extend in the second direction Y, and a pixel electrode PE. The pixel electrode PE is covered with the first alignment film AL1. In addition, the array substrate AR3 includes, as a part of the common electrode CE, a first sub-common electrode CB1 having a strip shape linearly extending in the first direction X. The first sub-common electrode CB1 has the same potential as the second main common electrodes CA2.

Since the first sub-common electrode CB1 crosses the pixel electrode PE, the first sub-common electrode CB1 cannot be formed in the same layer as the pixel electrode PE. Thus, an interlayer insulation film is interposed between the pixel electrode PE and the first sub-common electrode CB1. Incidentally, the first alignment film AL1 is located above each of the pixel electrode PE and first sub-common electrode CB1.

The first sub-common electrode CB1 is disposed between the first sub-pixel electrode PB and second sub-pixel electrode PC. In the example illustrated, the first sub-common electrode CB1 is disposed at a substantially central part of the pixel, and is opposed to the gate line C1 (or the first sub-common electrode CB1 is disposed above the gate line G1). At least the first interlayer insulation film 12 and second interlayer insulation film 13 are interposed as insulation films between the first sub-common electrode CB1 and the gate line G1.

The first sub-common electrode CB1 linearly extends within the active area, is led out of the active area, is electrically connected to the power supply module formed on the array substrate AR3, and is supplied with a common potential. In addition, in the case where the first sub-common electrode CB1 covers the gate line G1 in the active area, the width in the second direction Y of the first sub-common electrode CB1 is equal to or greater than the width in the second direction Y of the gate line G1.

Like the first structure example, the pixel electrode PE is disposed between the source line S1 and source line S2. The pixel electrode PE includes the main pixel electrode PA, first sub-pixel electrode PB and second sub-pixel electrode PC.

The main pixel electrode PA is located at a substantially middle point between the source line S1 and source line S2. The first sub-pixel electrode PB and second sub-pixel electrode PC are disposed on both sides of the first sub-common electrodes CB1. The second sub-pixel electrode PC is opposed to the storage capacitance line C1 (or the second sub-pixel electrode PC is disposed above the storage capacitance line C1).

In the meantime, the gate line G1 may be disposed at the upper side end portion or lower side end portion of the pixel PX, and the storage capacitance line C1 may be disposed at a substantially central part of the pixel. In this case, the first sub-pixel electrode PB or second sub-pixel electrode PC may be opposed to the gate line G1 (or the first sub-pixel electrode PB or second sub-pixel electrode PC may be disposed above the gate line G1), or the first sub-common electrode CB1 may be opposed to the storage capacitance line C1 (or the first sub-common electrode CB1 may be disposed above the storage capacitance line C1).

On the other hand, in the common electrode CE, the second main common electrode CAL2 and second main common electrode CAR2 are disposed on both sides of a position immediately above the main pixel electrode PA. In other words, the main pixel electrode PA is disposed between the second main common electrode CAL2 and second main common electrode CAR2.

In the example illustrated, the second main common electrode CAL2 is disposed at the left side end portion of the pixel PX, and is opposed to the source line S1 (or the second main common electrode CAL2 is disposed above the source line S1). In addition, the second main common electrode CAR2 is disposed at the right side end portion of the pixel PX, and is opposed to the source line S2 (or the second main common electrode CAR2 is disposed above the source line S2).

According to the third structure example, as described above, since four domains can be formed in one pixel, the viewing angle can optically be compensated in four directions, and a wider viewing angle can be realized. Furthermore, in addition to the advantageous effects described in connection with the first structure example, since the first sub-common electrode CB1 of the common electrode CE is so disposed as to be opposed to the gate line, an undesired electric field from the gate line can be shielded. It is thus possible to suppress application of an undesired bias from the gate line to the liquid crystal layer LQ, and to suppress the occurrence of a display defect such as burn-in. Therefore, a liquid crystal display device with a still higher display quality can be provided.

Besides, in the structure in which the interlayer insulation film is interposed between the pixel electrode PE and the first sub-common electrode CB1, as described above, the number of fabrication steps becomes larger than in the other structure examples. However, the total number of fabrication steps in this structure example is equal to the number of fabrication steps of conventional FFS-mode liquid crystal display devices. In the conventional FFS-mode liquid crystal display devices, one of structures for forming multiple domains in one pixel is a structure in which the pixel electrode is formed in an angle bracket (<) shape. A disclination tends to occur near a central part of this angle-bracket-shaped pixel electrode. Consequently, there may be a case in which the brightness of the entire pixel lowers. On the other hand, in the present embodiment, unlike the FFS-mode liquid crystal display device, no disclination occurs, and thus the brightness is enhanced.

In the meantime, the array substrate AR3, which has been described in connection with the third structure example, may be combined with the counter-substrate CT1 which was described in connection with the first structure example. In this case, the common electrode CE is configured to include, as the sub-common electrode, the first sub-common electrodes CB1 provided on the array substrate AR3 and the second sub-common electrodes CB2 provided on the counter-substrate CT1. In the region where the first sub-common electrodes CB1 and the second sub-common electrode CB2 are opposed to each other with the liquid crystal layer being interposed, it becomes possible to suppress the occurrence of an undesired vertical electric field (i.e. an electric field in a direction normal to the substrate major surface).

Fourth Structure Example

Next, a fourth structure example of the embodiment is described. The same structural parts as in the first structure example are denoted by like reference numerals, and a detailed description is omitted.

FIG. 11 is a plan view which schematically shows the structure of an array substrate AR4, at a time when the pixel PX of the liquid crystal display panel LPN in the fourth structure example of the embodiment is viewed from the counter-substrate CT side. Only the structure of the pixel PX, which is necessary for the description, is illustrated, and the depiction of a switching element, etc. is omitted.

In the fourth structure example, a common electrode CE includes first main common electrodes CA1 which are provided as main common electrodes on the array substrate AR4, and a first sub-common electrode CB1 which is provided as a sub-common electrode on the array substrate AR4.

The array substrate AR4, like the array substrate AR1, includes a storage capacitance line C1 and a storage capacitance line C2 which extend in the first direction X, a gate line G1 extending in the first direction X, a source line S1 and a source line S2 which extend in the second direction Y, and a pixel electrode PE. In addition, the array substrate AR4 includes a common electrode CE including first main common electrodes CA1 (CAL1 and CAR1) each having a strip shape linearly extending in the second direction Y, and a first sub-common electrodes CB1 having a strip shape linearly extending in the first direction X. In short, in the array substrate AR4, the common electrode CE is formed in a grid shape. The structure of the first main common electrodes CA1 is as has been described in connection with the array substrate AR2. The structure of the first sub-common electrode CB1 is as has been described in connection with the array substrate AR3. Incidentally, the first alignment film AL1 is located above each of the pixel electrode PE, first main common electrodes CA1 and first sub-common electrode CB1.

Although not described in detail, the first main common electrodes CA1 and first sub-common electrode CB1 of the common electrode CE are led out to the outside of the active area, are electrically connected to a power supply module formed on the array substrate AR4 via an electrically conductive member, and are supplied with a common potential.

The array substrate AR4, which has been described in connection with the fourth structure example, can be combined with any one of the counter-substrate CT1 which was described in connection with the first structure example, the counter-substrate CT2 which was described in connection with the second structure example, and the counter-substrate CT3 which was described in connection with the third structure example.

Figure 12:
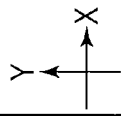
FIG. 12 is a view showing a summary of the combinations between the array substrates described in the first to fourth structure examples and the counter-substrates described in the first to third structure examples.

FIG. 12 shows a summary of the combinations between the array substrate AR1, array substrate AR2, array substrate AR3 and array substrate AR4, which have been described in the first to fourth structure examples, and the counter-substrate CT1, counter-substrate CT2 and counter-substrate CT3, which have been described in the first to third structure examples. In FIG. 12, a slash mark corresponds to combinations which cannot realize the basic structure of the embodiment, a double circle (⊚) corresponds to combinations described in the respective structure examples, and a white circle (○) corresponds to combinations which are feasible in the respective structure examples.

Next, a brief description will be given of structures of the pixel PX according to further variations of the embodiment.

FIG. 13 is a plan view which schematically shows one variation of the embodiment.

The pixel electrode PE includes two main pixel electrodes PA which extend in the second direction Y and are arranged in parallel at intervals in the first direction X, and a first sub-pixel electrode PB and a second sub-pixel electrode PC which extend in the first direction X. The pixel electrode PE is provided on the array substrate.

The common electrode CE includes main common electrodes CA which extend in the second direction Y, and a sub-common electrode CB which extends in the first direction X. The main common electrodes CA are disposed on both sides of the two main pixel electrodes PA. Specifically, three main common electrodes CA and two main pixel electrodes PA are alternately arranged. The sub-common electrode CB is disposed between the first sub-pixel electrode PB and second sub-pixel electrode PC. Specifically, the first sub-pixel electrode PB and second sub-pixel electrode PC, and one sub-common electrode CB are alternately arranged. As regards this common electrode CE, too, at least a part of the main common electrodes CA and sub-common electrode CB is provided on the counter-substrate.

In this structure, eight regions are formed in one pixel, and at the ON time, liquid crystal molecules are aligned in directions indicated in the Figure. With this structure, the same advantageous effects as with the above-described structure examples can be obtained.

FIG. 14 is a plan view which schematically shows another variation of the embodiment.

The pixel electrode PE includes a main pixel electrode PA which extends in the second direction Y, and a first sub-pixel electrode PB and a second sub-pixel electrode PC which extend in the first direction X. The first sub-pixel electrode PB and second sub-pixel electrode PC are not coupled to end portions of the main pixel electrode PA, but are coupled to the main pixel electrode PA at positions closer to the central part of the pixel. The pixel electrode PE is provided on the array substrate.

The common electrode CE includes main common electrodes CA which extend in the second direction Y, and sub-common electrodes CB which extend in the first direction X. The main common electrodes CA are disposed on both sides of the pixel electrode PE. Specifically, two main common electrodes CA and one main pixel electrode PA are alternately arranged. The sub-common electrodes CB are disposed on both sides of each of the first sub-pixel electrode PB and second sub-pixel electrode PC. Specifically, three sub-common electrodes CB, and the first sub-pixel electrode PB and second sub-pixel electrode PC are alternately arranged. As regards this common electrode CE, too, at least a part of the main common electrodes CA and sub-common electrodes CB is provided on the counter-substrate.

In this structure, eight regions are formed in one pixel, and at the ON time, liquid crystal molecules are aligned in directions indicated in the Figure. With this structure, the same advantageous effects as with the above-described structure examples can be obtained.

Figure 15:
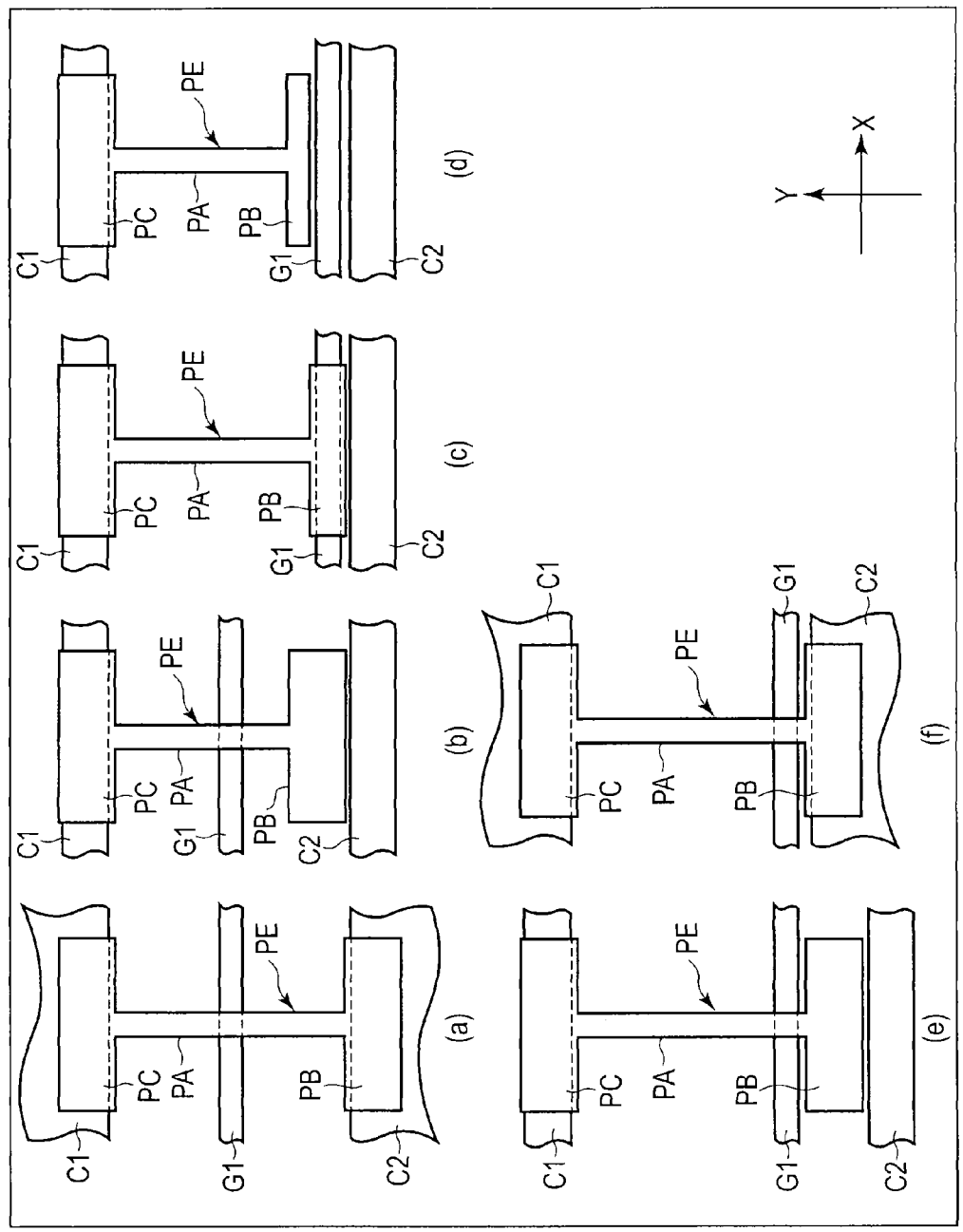
FIG. 15 is a view for explaining the positional relationships between a pixel electrode, a gate line and storage capacitance lines, which are applicable in the embodiment.

FIG. 15 is a view for explaining the positional relationships between the first sub-pixel electrode PB and second sub-pixel electrode PC of the pixel electrode PE, the gate line G1 and the storage capacitance lines C1 and C2, which are applicable in the embodiment.

Examples shown in parts (a) and (b) of FIG. 15 correspond to the case in which the gate line G1 is located at a substantially middle point between the storage capacitance line C1 and storage capacitance line C2. Examples shown in parts (c) to (f) of FIG. 15 correspond to the case in which the gate line G1 is located closer to the storage capacitance line C2 than to the storage capacitance line C1. In each of the examples shown in (a) to (f), the second sub-pixel electrode PC is located above the storage capacitance line C1.

In the examples shown in parts (a) to (f) of the Figure, the first sub-pixel electrode PB is located above the storage capacitance line C2. In this case, a sub-pixel electrode of a pixel electrode, which neighbors the illustrated pixel electrode PE on the upper side, is also located above the storage capacitance line C1, and a sub-pixel electrode of a pixel electrode, which neighbors the illustrated pixel electrode PE on the lower side, is also located above the storage capacitance line C2.

In the examples shown in part (b) and (e) of FIG. 15, the first sub-pixel electrode PB is located between the gate line G1 and storage capacitance line C2. In the example shown in part (c) of FIG. 15, the first sub-pixel electrode PB is located above the gate line G1. In the example shown in part (d) of FIG. 15, the first sub-pixel electrode PB is located between the gate line G1 and storage capacitance line C1.

In each of the examples, the counter-substrates CT1 to CT3 are applicable, and any one of the array substrate AR2 including the first main common electrodes CA1, the array substrate AR3 including the sub-common electrode CB1, and the array substrate AR4 including the first main common electrodes CA1 and first sub-common electrode CB1 is applicable.

The above-described embodiment is particularly suited to such a configuration that capacitance coupling dot inversion driving (CCDI driving), in which capacitance coupling driving is executed by dot inversion driving, is performed. Specifically, in the capacitance coupling driving (CC driving), a predetermined voltage is reached by superimposing a storage capacitance signal on the pixel electrode PE via the storage capacitance CS of each pixel. Thus, when the storage capacitance CS and the pixel capacitance are made substantially equal, the signal voltage amplitude can be substantially halved. In the CCDI driving, storage capacitances CS of mutually neighboring pixels PX are connected to mutually different storage capacitance lines, and storage capacitance voltages, which are supplied to the storage capacitances CS of the mutually neighboring pixels PX, are set to have mutually different polarities. For example, in the case where the storage capacitance CS of the pixel PX of FIG. 6 is connected to the storage capacitance line C1, the storage capacitance CS of a neighboring pixel PX is connected to the storage capacitance line C2. In this manner, by connecting the storage capacitance of the pixel and the storage capacitance line, the storage capacitance voltages, which are supplied to the storage capacitances CS of the mutually neighboring pixels PX, can be made different (e.g. "high" and "low"). The above-described gate driver GD, source driver SD, and driving IC chip 2, which incorporates a controller, function as a driving mechanism for executing such CCDI driving, and are provided on the array substrate AR.

According to the structure in which the CCDI driving is applied, the power consumption can be reduced and the degradation in display quality can be suppressed.

As has been described above, according to the present embodiment, a liquid crystal display device with good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, and a first alignment film which is formed of a material exhibiting horizontal alignment properties and covers the main pixel electrode, the first sub-pixel electrode and the second sub-pixel electrode;
   a second substrate including second main common electrodes extending in the second direction on both sides of the main pixel electrode, a second sub-common electrode which is continuous with the second main common electrodes and extends in the first direction between the first sub-pixel electrode and the second sub-pixel electrode, and a second alignment film which is formed of a material exhibiting horizontal alignment properties and covers the second main common electrodes and the second sub-common electrode; and
   a liquid crystal layer including liquid crystal molecules held between the first substrate and the second substrate.

2. The liquid crystal display device of claim 1, wherein an initial alignment direction of the liquid crystal molecules is substantially parallel to the second direction, in a state in which no electric field is produced between the main pixel electrode and the second main common electrodes.

3. The liquid crystal display device of claim 2, wherein the first substrate further includes first main common electrodes which are opposed to the first source line and the second source line, respectively, extend in the second direction, are covered with the first alignment film, and have the same potential as the second main common electrodes.

4. The liquid crystal display device of claim 2, wherein the first substrate further includes a first sub-common electrode which is opposed to the gate line, extends in the first direction, is covered with the first alignment film, and has the same potential as the second main common electrodes.

5. The liquid crystal display device of claim 2, wherein the first substrate further includes a first sub-common electrode which is opposed to the gate line, extends in the first direction, is covered with the first alignment film, and has the same potential as the second main common electrodes, and first main common electrodes which are continuous with the first sub-common electrode, are opposed to the first source line and the second source line, respectively, extend in the second direction, and are covered with the first alignment film.

6. A liquid crystal display device comprising:
   a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, first main common electrodes which are opposed to the first source line and the second source line, respectively, and extend in the second direction, and a first alignment film which is formed of a material exhibiting horizontal alignment properties and covers the main pixel electrode, the first sub-pixel electrode, the second sub-pixel electrode and the first main common electrodes;
   a second substrate including a second sub-common electrode which extends in the first direction between the first sub-pixel electrode and the second sub-pixel electrode, and a second alignment film which is formed of a material exhibiting horizontal alignment properties and covers the second sub-common electrode; and
   a liquid crystal layer including liquid crystal molecules held between the first substrate and the second substrate.

7. The liquid crystal display device of claim 6, wherein an initial alignment direction of the liquid crystal molecules is substantially parallel to the second direction, in a state in which no electric field is produced between the main pixel electrode and the first main common electrodes.

8. The liquid crystal display device of claim 7, wherein the first substrate further includes a first sub-common electrode which is continuous with the first main common electrodes, is opposed to the gate line, extends in the first direction, and is covered with the first alignment film.

9. A liquid crystal display device comprising:
a first substrate including a first storage capacitance line and a second storage capacitance line which extend in a first direction, a gate line which extends in the first direction and is located between the first storage capacitance line and the second storage capacitance line, a first source line and a second source line which extend in a second direction crossing the first direction, a main pixel electrode which is located between the first source line and the second source line and has a strip shape extending in the second direction, a first sub-pixel electrode which is continuous with the main pixel electrode, is opposed to the first storage capacitance line and has a strip shape extending in the first direction, a second sub-pixel electrode which is continuous with the main pixel electrode, is spaced apart from the first sub-pixel electrode and has a strip shape extending in the first direction, a first sub-common electrode which is opposed to the gate line and extends in the first direction, and a first alignment film which is formed of a material exhibiting horizontal alignment properties and covers the main pixel electrode, the first sub-pixel electrode, the second sub-pixel electrode and the first sub-common electrode;
a second substrate including second main common electrodes which extend in the second direction on both sides of the main pixel electrode and have the same potential as the first sub-common electrode, and a second alignment film which is formed of a material exhibiting horizontal alignment properties and covers the second main common electrodes; and
a liquid crystal layer including liquid crystal molecules held between the first substrate and the second substrate.

10. The liquid crystal display device of claim 9, wherein an initial alignment direction of the liquid crystal molecules is substantially parallel to the second direction, in a state in which no electric field is produced between the main pixel electrode and the second main common electrodes.

11. The liquid crystal display device of claim 10, wherein the first substrate further includes first main common electrodes which are continuous with the first sub-common electrode, are opposed to the first source line and the second source line, respectively, extend in the second direction, and are covered with the first alignment film.

12. The liquid crystal display device of claim 1, wherein the second sub-pixel electrode is located between the second storage capacitance line and the gate line, or between the first storage capacitance line and the gate line.

13. The liquid crystal display device of claim 1, wherein the second sub-pixel electrode is located above the second storage capacitance line.

14. The liquid crystal display device of claim 1, wherein the first sub-pixel electrode is continuous with one end portion of the main pixel electrode, and the second sub-pixel electrode is continuous with the other end portion of the main pixel electrode.

15. The liquid crystal display device of claim 14, wherein main pixel electrode is located at a substantially middle point between the first source line and the second source line.

16. The liquid crystal display device of claim 1, wherein the second main common electrodes are located above the first source line and the second source line, respectively.

17. The liquid crystal display device of claim 1, wherein the second sub-common electrode is located above the gate line.

18. The liquid crystal display device of claim 1, wherein a first alignment treatment direction, in which the first alignment film initially aligns the liquid crystal molecules, and a second alignment treatment direction, in which the second alignment film initially aligns the liquid crystal molecules, are substantially parallel to each other, and
the liquid crystal molecules are splay-aligned or homogeneously aligned between the first substrate and the second substrate.

19. The liquid crystal display device of claim 18, further comprising a first polarizer which is disposed on an outer surface of the first substrate and includes a first polarization axis, and a second polarizer which is disposed on an outer surface of the second substrate and includes a second polarization axis having a positional relationship of crossed Nicols with the first polarization axis, wherein the first polarization axis of the first polarizer is perpendicular or parallel to an initial alignment direction of the liquid crystal molecules.

20. The liquid crystal display device of claim 1, wherein the first substrate includes a driving mechanism for executing capacitance coupling dot inversion driving.

* * * * *